United States Patent
Haga et al.

(10) Patent No.: US 10,541,584 B2
(45) Date of Patent: Jan. 21, 2020

(54) MOTOR

(71) Applicant: Nidec Corporation, Kyoto (JP)

(72) Inventors: Hidehiro Haga, Kyoto (JP); Ryusuke Sato, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 381 days.

(21) Appl. No.: 15/472,321

(22) Filed: Mar. 29, 2017

(65) Prior Publication Data

US 2017/0201148 A1 Jul. 13, 2017

Related U.S. Application Data

(63) Continuation of application No. PCT/JP2015/076570, filed on Sep. 17, 2015.

(30) Foreign Application Priority Data

Sep. 30, 2014 (JP) ................. 2014-201412

(51) Int. Cl.
*H02K 3/28* (2006.01)
*H02K 3/50* (2006.01)
(Continued)

(52) U.S. Cl.
CPC ............... *H02K 5/225* (2013.01); *H02K 3/28* (2013.01); *H02K 3/50* (2013.01); *H02K 3/522* (2013.01);
(Continued)

(58) Field of Classification Search
CPC ............ H02K 3/28; H02K 3/50; H02K 5/225; H02K 5/04; H02K 5/10; H02K 5/1732;
(Continued)

(56) References Cited

U.S. PATENT DOCUMENTS 6,931,957 B2 8/2005 Saito et al.
7,215,115 B2 5/2007 Saito et al.
(Continued)

FOREIGN PATENT DOCUMENTS

JP 2004-248492 A 9/2004
JP 2007-006592 A 1/2007
(Continued)

OTHER PUBLICATIONS

Kawamura Mikio; Uchida Makoto; Otawara Masahiro; Miyashita Naoyuki; Saito Keiki, Jul. 15, 2010; Mitsuba Corp, JP 2010158094 (English Machine Translation) (Year: 2010).*
(Continued)

*Primary Examiner* — Mang Tin Bik Lian
*Assistant Examiner* — Alexander A Singh
(74) *Attorney, Agent, or Firm* — Keating & Bennett

(57) ABSTRACT

A motor includes a bus bar holder with a bottom portion widening from an inner surface of a main body portion to a radially inner side, and protrusion portions extending from the bottom portion toward one side. A wiring member held by the bus bar holder includes circuit board connection terminals electrically connected to one surface of the circuit board. The circuit board connection terminals are arranged in a predetermined direction at one surface of the circuit board. An outer edge of the circuit board is provided with a first notch portion in which one of the protrusions is located. The first notch portion is opened toward any one of a direction from the center axis to the circuit board connection terminal and a predetermined direction, when viewed from one direction.

32 Claims, 24 Drawing Sheets

(51) Int. Cl.
    *H02K 5/22*     (2006.01)
    *H02K 5/04*     (2006.01)
    *H02K 3/52*     (2006.01)
    *H02K 11/30*     (2016.01)
    *H02K 7/08*     (2006.01)

(52) U.S. Cl.
CPC ............... *H02K 5/04* (2013.01); *H02K 7/083* (2013.01); *H02K 11/30* (2016.01); *H02K 2203/03* (2013.01); *H02K 2211/03* (2013.01)

(58) Field of Classification Search
CPC .......... H02K 5/22; H02K 7/083; H02K 11/21; H02K 11/215; H02K 11/33; H02K 11/30; H02K 2211/03
USPC ........................................................... 310/71
See application file for complete search history.

(56) References Cited

U.S. PATENT DOCUMENTS

| | | | |
|---|---|---|---|
| 7,427,860 B2 | 9/2008 | Saito et al. | |
| 7,588,444 B2 | 9/2009 | Kataoka et al. | |
| 7,990,001 B2 | 8/2011 | Hatano et al. | |
| 8,729,754 B2 | 5/2014 | Fujii et al. | |
| 8,963,388 B2 | 2/2015 | Miyachi et al. | |
| 9,045,156 B2 | 6/2015 | Omae et al. | |
| 9,509,196 B2 | 11/2016 | Yongzuo et al. | |
| 2012/0098361 A1* | 4/2012 | Yamasaki | B62D 5/0406 310/52 |
| 2013/0106257 A1 | 5/2013 | Song et al. | |
| 2013/0207491 A1* | 8/2013 | Hatfield | H02K 3/522 310/50 |
| 2015/0076941 A1 | 3/2015 | Song et al. | |
| 2015/0357886 A1 | 12/2015 | Ishizeki et al. | |

FOREIGN PATENT DOCUMENTS

| | | | |
|---|---|---|---|
| JP | 2007-185055 | A | 7/2007 |
| JP | 2007-221976 | A | 8/2007 |
| JP | 2007-221977 | A | 8/2007 |
| JP | 2010-161863 | A | 7/2010 |
| JP | 2010158094 | A * | 7/2010 |
| JP | 2010-172086 | A | 8/2010 |
| JP | 4552254 | B2 | 9/2010 |
| JP | 2013-153633 | A | 8/2013 |
| JP | 2013-247761 | A | 12/2013 |
| JP | 5386072 | B2 | 1/2014 |

OTHER PUBLICATIONS

Official Communication issued in corresponding International Application PCT/JP2015/069676, dated Sep. 29, 2015.
Official Communication issued in corresponding International Application PCT/JP2015/076570, dated Dec. 8, 2015.
Official Communication issued in corresponding International Application PCT/JP2015/069677, dated Oct. 6, 2015.
Official Communication issued in corresponding International Application PCT/JP2015/069678, dated Sep. 15, 2015.
Official Communication issued in corresponding International Application PCT/JP2015/076571, dated Dec. 15, 2015.
Official Communication issued in corresponding International Application PCT/JP2015/076569, dated Dec. 22, 2015.
Haga, H. et al.; "Motor"; U.S. Appl. No. 15/472,320, filed Mar. 29, 2017.
Haga, H. et al.; "Motor"; U.S. Appl. No. 15/472,349, filed Mar. 29, 2017.
Haga, H. et al.; "Motor"; U.S. Appl. No. 15/472,322, filed Mar. 29, 2017.
Haga, H. et al.; "Motor"; U.S. Appl. No. 15/472,323, filed Mar. 29, 2017.
Haga, H. et al.; "Motor"; U.S. Appl. No. 15/472,324, filed Mar. 29, 2017.

* cited by examiner

MOTOR

CROSS REFERENCE TO RELATED APPLICATIONS

This application claims the benefit of priority to Japanese Patent Application No. 2014-201412 filed on Sep. 30, 2014 and is a Continuation Application of PCT Application No. PCT/JP2015/076570 filed on Sep. 17, 2015. The entire contents of each application are hereby incorporated herein by reference.

BACKGROUND OF THE INVENTION

1. Field of the Invention

The present invention relates to a motor.

2. Description of the Related Art

Conventionally, if a control board is mounted to a motor including a bus bar holder, various fixing methods are used. For example, a notch portion is provided in the control board and a rib is hooked in the notch portion, such that the control board is fixed to the motor.

Further, if the motor includes a bus bar holder embedded with a sensor connection bus bar, the sensor connection bus bar may be connected to an external controller through the connector portion of the bus bar holder.

In this case, connection between the circuit board connection terminal of the wiring member embedded in the bus bar holder and the circuit board encounters unexpected problems. That is, there is a need for strongly connecting the circuit board to the circuit board connection terminal. Further, there is a need for the circuit board to be disposed in the bus bar holder with high position accuracy.

SUMMARY OF THE INVENTION

In accordance with an exemplary preferred embodiment of the present invention, a motor includes a rotor including a shaft with a center on a center axis extending in one direction; a stator enclosing the rotor and rotating the rotor about the center axis; a first bearing which is disposed at a first side in the one direction of the stator and supports the shaft; a second bearing which is disposed at a second side opposite to the first side of the stator and supports the shaft; a cylindrical housing holding the stator and the first bearing; a bus bar assembly holding the second bearing and allowing an end of the first side to be located in the housing; a cover fixed to the housing to cover at least a portion of the second side of the bus bar assembly; and a circuit board which is disposed between the second bearing and the cover in the one direction, and allows a surface of the second side to cross the one direction, wherein the bus bar assembly includes a bus bar electrically connected to the stator; a wiring member electrically connecting an external power supply to the circuit board; and a bus bar holder holding the bus bar and the wiring member, the bus bar holder includes a cylindrical main body portion including an opening at the second side; a connector portion protruding from the main body portion toward a radially outer side of the center axis; a bottom portion widening from an inner surface of the main body portion to the radially inner side; and a plurality of protrusion portions extending from the bottom portion toward the second side, the cover covers the second side of the opening, the wiring member includes an external power-supply connection terminal provided on the connector portion to be electrically connected to the external power-supply; and a plurality of circuit board connection terminals electrically connected to the surface of the second side of the circuit board, wherein the plurality of circuit board connection terminals is arranged along a predetermined direction at the surface of the second side of the circuit board; the protrusion portion includes a first protrusion portion; and an outer edge of the circuit board is provided with a first notch portion in which the first protrusion portion is inserted, wherein the first notch portion is opened toward a direction from the center axis to the circuit board connection terminal or the predetermined direction when viewed from the one direction.

In accordance with an exemplary preferred embodiment of the present invention, a motor includes a rotor including a shaft with a center on a center axis extending in one direction; a stator enclosing the rotor and rotating the rotor about the center axis; a first bearing which is disposed at a first side in the one direction of the stator and supports the shaft; a second bearing which is disposed at a second side opposite to the first side of the stator and supports the shaft; a cylindrical housing holding the stator and the first bearing; a bus bar assembly holding the second bearing and allowing an end of the first side to be located in the housing; a cover fixed to the housing to cover at least a portion of the second side of the bus bar assembly; and a circuit board which is disposed between the second bearing and the cover in the one direction, and allows a surface of the second side to cross the one direction, wherein the bus bar assembly includes a bus bar electrically connected to the stator; a wiring member electrically connecting an external power supply to the circuit board; and a bus bar holder holding the bus bar and the wiring member, the bus bar holder includes a cylindrical main body portion including an opening at the second side; a connector portion protruding from the main body portion toward a radially outer side of the center axis; a bottom portion widening from an inner surface of the main body portion to the radially inner side; and a plurality of protrusion portions extending from the bottom portion toward the second side, the cover covers the second side of the opening, the wiring member includes an external power-supply connection terminal provided on the connector portion so as to be electrically connected to the external power-supply; and a plurality of circuit board connection terminals electrically connected to the surface of the second side of the circuit board, wherein the plurality of circuit board connection terminals is arranged along a predetermined direction at the surface of the second side of the circuit board; the protrusion portion includes a first protrusion portion; and the circuit board is provided with an elongated hole portion in which the first protrusion portion is inserted, wherein the elongated hole portion extends toward a direction to connect the center axis to the circuit board connection terminal when viewed from the one direction, or extends in the predetermined direction, and the first protrusion portion contacts an inner edge of the elongated hole portion at one end of the elongated hole portion.

In accordance with an exemplary preferred embodiment of the present invention, a motor includes a rotor including a shaft with a center on a center axis extending in one direction; a stator enclosing the rotor and rotating the rotor about the center axis; a first bearing which is disposed at a first side in the one direction of the stator and supports the shaft; a second bearing which is disposed at a second side opposite to the first side of the stator and supports the shaft; a cylindrical housing holding the stator and the first bearing; a bus bar assembly holding the second bearing and allowing an end of the first side to be located in the housing; a cover fixed to the housing to cover at least a portion of the second side of the bus bar assembly; and a circuit board which is disposed between the second bearing and the cover in the one direction, and allows a surface of the second side to cross the one direction, wherein the bus bar assembly includes a bus bar electrically connected to the stator; a wiring member electrically connecting an external power supply to the circuit board; and a bus bar holder holding the bus bar and the wiring member, the bus bar holder includes a cylindrical main body portion including an opening at the second side; a connector portion protruding from the main body portion toward a radially outer side of the center axis; a bottom portion widening from an inner surface of the main body portion to the radially inner side; and a plurality of protrusion portions extending from the bottom portion toward the second side, the cover covers the second side of the opening, the wiring member includes an external power-supply connection terminal provided in the connector portion to be electrically connected to the external power-supply; and a plurality of circuit board connection terminals electrically connected to the surface of the second side of the circuit board, wherein the plurality of circuit board connection terminals is arranged along a predetermined direction at the surface of the second side of the circuit board; the protrusion portion includes a first protrusion portion; and an outer edge of the circuit board is provided with a first notch portion in which the first protrusion portion is inserted; the end of the second side of the first protrusion portion is provided with a claw portion; and wherein the first protrusion portion is fixed to the circuit board by snap-fit connection.

The above and other elements, features, steps, characteristics and advantages will become more apparent from the following detailed description of the present preferred embodiments with reference to the attached drawings.

DETAILED DESCRIPTION OF THE PREFERRED EMBODIMENTS

Motors according to preferred embodiments of the present invention will hereinafter be described with reference to the attached drawings. Further, the scope of the present invention is not limited to the following preferred embodiments, but may be arbitrarily changed within the technical spirit of the present invention. To easily understand each component in the following drawings, actual structures, and a scale of each structure, the number of structures, etc., may be different.

Figure 1:
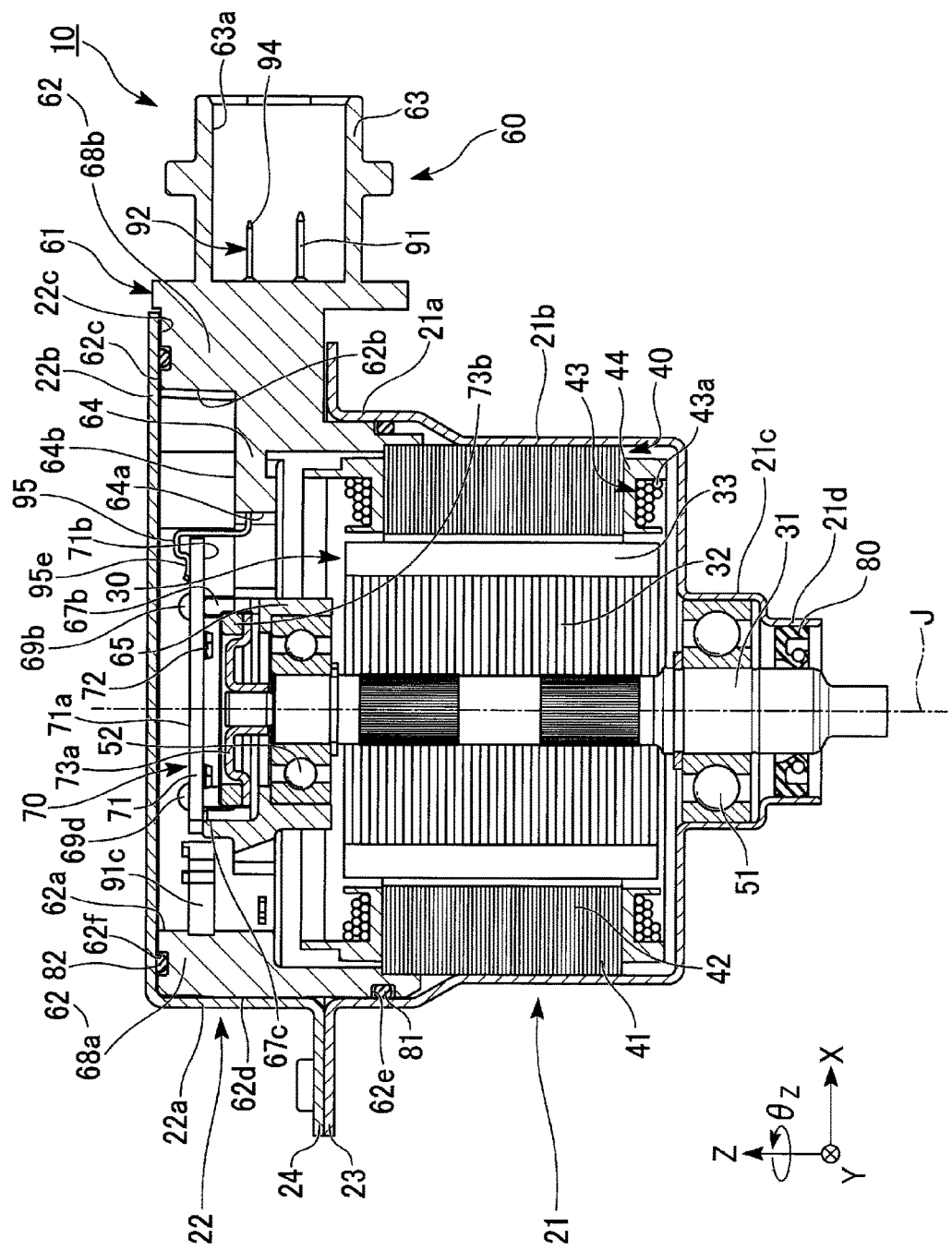
FIG. 1 is a cross-sectional view illustrating a motor according to a first preferred embodiment of the present invention.

In the drawings, an X-Y-Z coordinate system is provided as an appropriate three-dimensional (3D) orthogonal coordinate system. In the X-Y-Z coordinate system, a direction parallel to the axial direction (one direction) of a center axis J shown in FIG. 1 will hereinafter be referred to as a Z-axis direction. A direction parallel to a longitudinal direction of a bus bar assembly 60 shown in FIG. 1, that is, the left-and-right direction of FIG. 1, is referred to as an X-axis direction. A direction parallel to a width direction of the bus bar assembly 60, that is, a direction perpendicular to both the X-axis direction and the Z-axis direction, is referred to as a Y-axis direction.

In the following description, a positive side of the Z-axis direction (+Z side, a second side) will hereinafter be defined as 'rear side' and a negative side of the Z-axis direction (−Z side, a first side) will hereinafter be defined as 'front side.' It is to be understood that the descriptions of the rear side and the front side are used for explanation only, and they do not limit location relation or direction of the actual motor, members, and the like. Unless otherwise explained, a direction parallel to the center axis J (Z-axis direction) is simply referred to as 'axial direction,' a radial direction having its center on the center axis J is simply referred to as 'radial direction,' and a circumferential direction having its center on the center axis J, that is, the axial circumference of center axis J (θZ direction), is simply referred to as 'circumferential direction.'

Further, herein, descriptions such as being axially extended do not only refer to a case of strictly being extended in the axial direction (Z-axis direction), but it may also include the other case of being extended in a direction inclined at less than about 45° relative to the axial direction. Also, descriptions such as being radially extended do not only refer to a case of strictly being extended in the radial direction, that is, the direction perpendicular to the axial direction (Z-axis direction), but it may also include a case of being extended in a direction inclined at less than about 45° relative to the radial direction.

Figure 2:
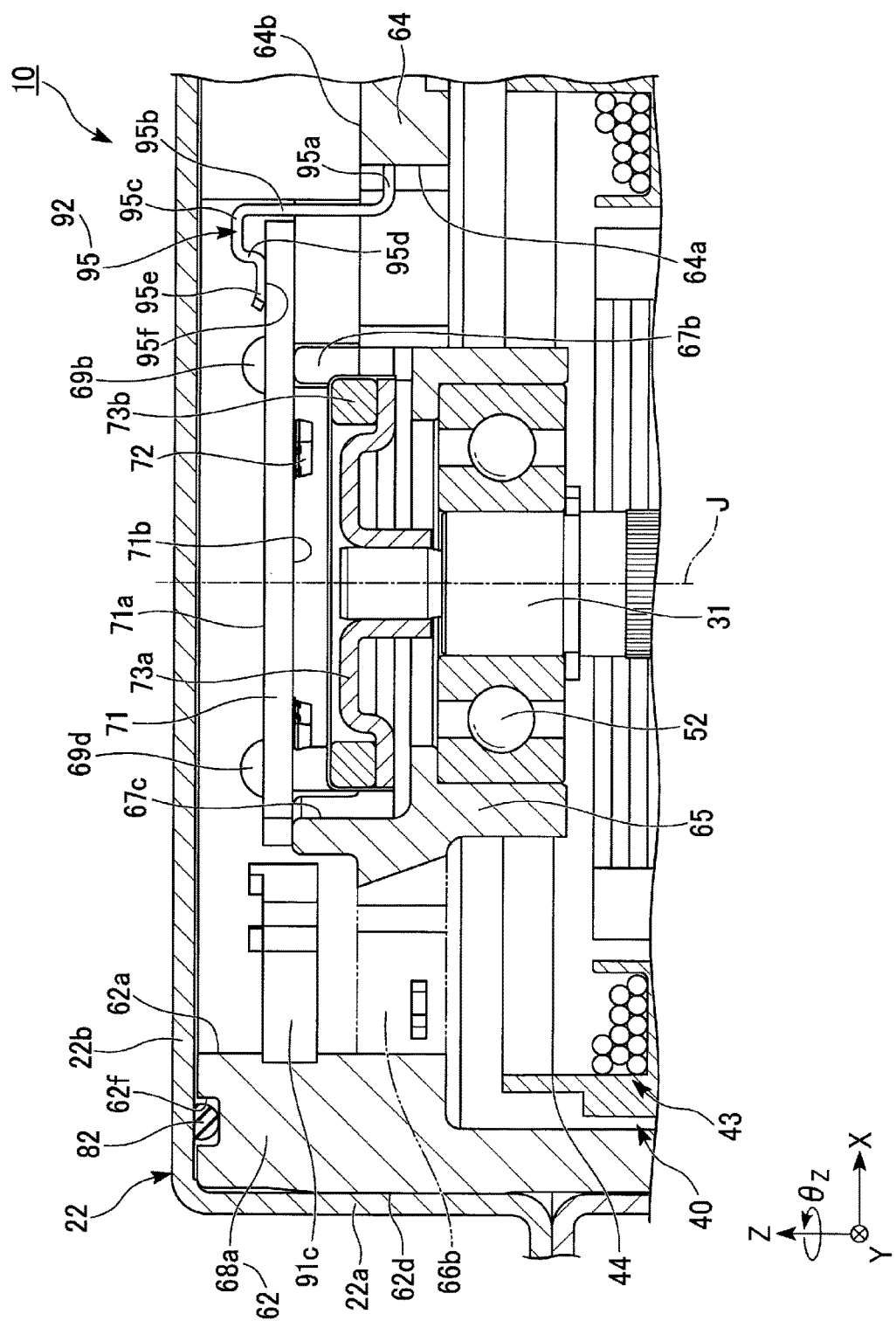
FIG. 2 is a partially enlarged cross-sectional view illustrating the motor according to a first preferred embodiment of the present invention.
Figure 3:
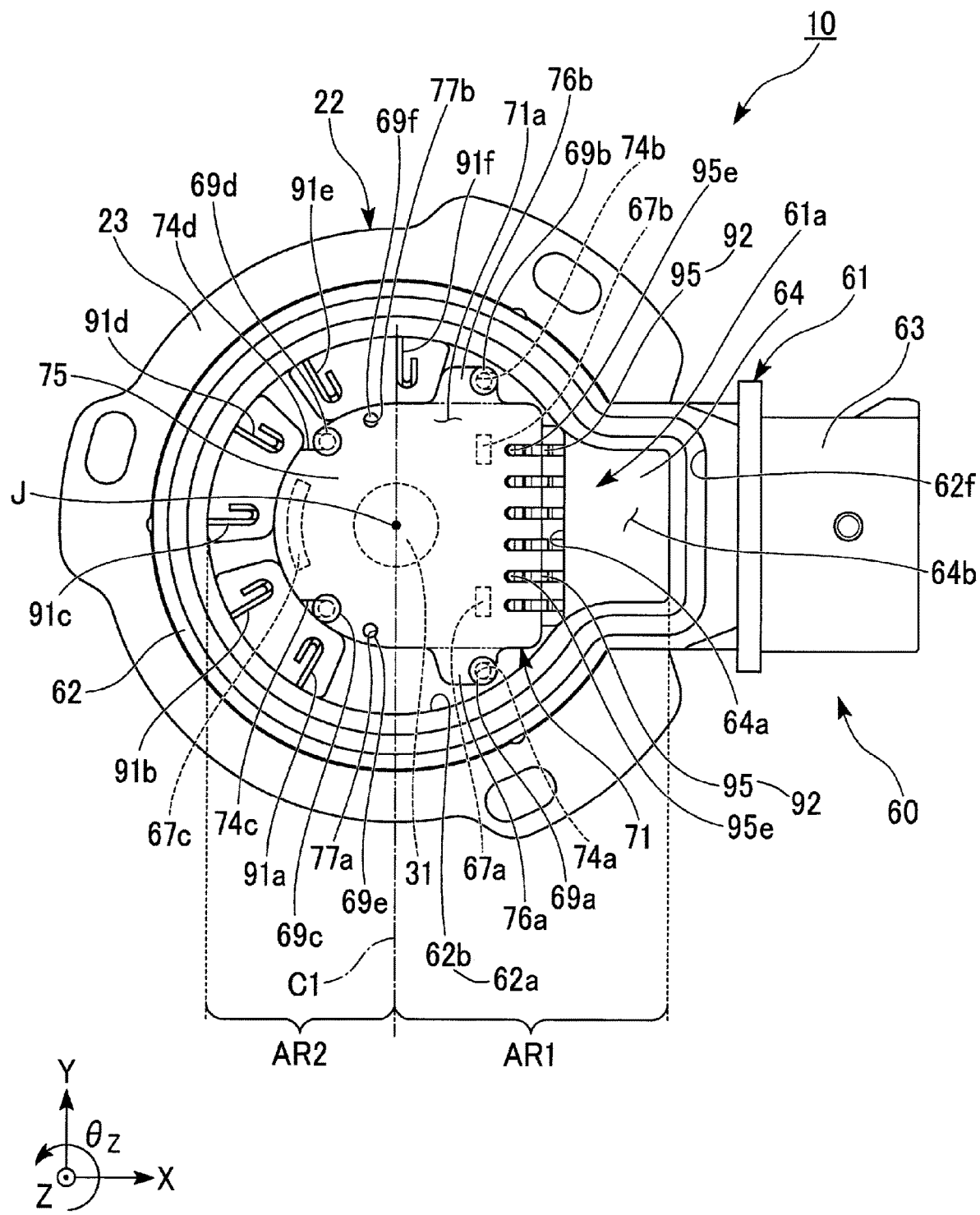
FIG. 3 is a plan view illustrating the motor according to a first preferred embodiment of the present invention.

FIG. 1 is a cross-sectional view illustrating a motor 10 according to a preferred embodiment of the present invention. FIG. 2 is a cross-sectional view illustrating a portion of the motor 10, and is a partially enlarged view of FIG. 1. FIG. 3 is a plan view (XY plane view) illustrating the portion of the motor 10. In FIG. 3, a depiction of a cover 22 is omitted.

The motor 10 according to the present preferred embodiment is a brushless motor. As illustrated in FIGS. 1 to 3, the motor 10 preferably includes a housing 21, a cover 22, a rotor 30 including a shaft 31, a stator 40, a first bearing 51, a second bearing 52, a controller 70, a bus bar assembly 60, and a plurality of O-rings. The plurality of O-rings preferably includes a front side O-ring 81 and a rear side O-ring 82.

The rotor 30, the stator 40, the first bearing 51, and the oil seal 80 are accommodated in the housing 21. The housing 21 is opened toward the rear side (+Z side). An end of the front side (−Z side) of the bus bar assembly 60 is inserted into the opening of the housing 21. The bus bar assembly 60 holds the second bearing 52. The first bearing 51 and the second bearing 52 support both sides of the axial direction (Z-axis direction) of the shaft 31.

The cover 22 covers at least a portion of the rear side (+Z side) of the bus bar assembly 60. The cover 22 is fixed to the housing 21. The cover 22 preferably includes a cylindrical portion 22a, a cover portion 22b, a front surface 22c of the cover, and a rear side flange portion 24. The controller 70 is located between the second bearing 52 and the cover 22. The controller 70 includes a circuit board 71. The front side O-ring 81 is located between the bus bar assembly 60 and the housing 21. The rear side O-ring 82 is located between the bus bar assembly 60 and the cover 22. Hereinafter, each component will be described in greater detail below.

As illustrated in FIG. 1, the housing 21 is preferably a cylindrical or substantially cylindrical member, and holds the stator 40 and the first bearing 51. In the present preferred embodiment, the housing 21 preferably has a multi-stepped cylindrical shape with open ends on both sides. In this preferred embodiment, a material of the housing 21 is, for example, metal. In more detail, it is preferred that a material of the housing 21 is, for example, aluminum, iron alloy, or the like.

The housing 21 preferably includes a front side flange portion 23, a bus bar assembly insertion portion 21a, a stator holding portion 21b, a front bearing holding portion 21c, and an oil seal holding portion 21d. The front side flange portion 23, the bus bar assembly insertion portion 21a, the stator holding portion 21b, the front bearing holding portion 21c, and the oil seal holding portion 21d are disposed in a direction from the rear side (+Z side) to a front side (−Z side) along the axial direction (Z-axis direction). That is, in the housing 21, the front side flange portion 23 is preferably disposed at a rearmost side and the oil seal holding portion 21d is preferably disposed at a frontmost side. Each of the bus bar assembly insertion portion 21a, the stator holding portion 21b, the front bearing holding portion 21c, and the oil seal holding portion 21d has a concentric cylindrical or substantially cylindrical shape. Diameters of the above members are reduced in the order of the bus bar assembly insertion portion 21a, the stator holding portion 21b, the front bearing holding portion 21c, and the oil seal holding portion 21d.

The front side flange portion 23 extends from the end of the rear side (+Z side) of the bus bar assembly insertion portion 21a toward a radially outer side. That is, the housing 21 includes a housing flange portion 23 at the end of the rear side. The bus bar assembly insertion portion 21a encloses an end of a front side (−Z side) of the bus bar assembly 60 from the radially outer side of the center axis J. In other words, at least a portion of the end of the front side (−Z side) of the bus bar assembly 60 is disposed in the bus bar assembly insertion portion 21a. That is, the end of the front side of the bus bar assembly 60 is disposed in the housing 21.

An outer surface of a stator 40 (preferably an outer surface of a core back portion 41, to be described later) is fitted into an inner surface of the stator holding portion 21b. Accordingly, the stator 40 is held by the housing 21. The front bearing holding portion 21c holds the first bearing 51. In this preferred embodiment, the inner surface of the front bearing holding portion 21c is fitted into the outer surface of the first bearing 51. The oil seal 80 is held in the oil seat holding portion 21d.

The rotor 30 preferably includes a shaft 31, a rotor core 32, and a rotor magnet 33. The shaft 31 has its center on the center axis J which extends in one direction (Z-axis direction). According to this exemplary preferred embodiment, the shaft 31 is a cylindrical or substantially cylindrical member. Further, the shaft 31 may be a solid member or as a hollow cylindrical member. The shaft 31 is rotatably supported around the axis (in ±θZ direction) by the first bearing 51 and the second bearing 52. The end of the front side (−Z side) of the shaft 31 protrudes to the outside of the housing 21. In the oil seal holding portion 21d, the oil seal 80 is disposed around the axis of the shaft 31.

The rotor core 32 is preferably a cylindrical or substantially cylindrical member. The rotor core 32 is fixed to the shaft 31 while enclosing the shaft 31 around the axis (in the θZ direction). In more detail, the rotor core 32 preferably includes a through-hole which penetrates axially through the rotor core 32. At least a portion of the shaft 31 is disposed within the through-hole of the rotor core 32. The shaft 31 is fixed to the rotor core 32 by, for example, press-fitting, adhesion, or the like. The rotor magnet 33 is fixed to an outer surface along an axis circumference of the rotor core 32. In more detail, according to this exemplary preferred embodiment, the rotor magnet 33 preferably has an annular or substantially annular shape. The outer surface of the rotor core 32 faces the inner surface of the rotor magnet 33. The rotor magnet 33 is fixed to the rotor core 32 by, for example, an adhesive, or the like. Further, the shape of the rotor magnet 33 is not necessarily annular. The rotor magnet 33 may be defined by a plurality of magnets which are arranged on an outer circumferential surface of the rotor core 32 in a circumferential direction. The rotor core 32 and the rotor magnet 33 rotates integrally with the shaft 31.

The stator 40 preferably has a cylindrical or substantially cylindrical shape. The rotor 30 is located in the stator 40. In other words, the stator 40 encloses the rotor 30 around the axis (in the θZ direction). The rotor 30 may relatively rotate around the center axis J with respect to the stator 40. The stator 40 preferably includes a core back portion 41, a plurality of teeth portions 42, a plurality of coils 43, and a plurality of bobbins 44. According to this exemplary preferred embodiment, the core back portion 41 and the teeth portion 42 includes a stacked steel plate in which a plurality of electromagnetic steel plates are stacked.

The core back portion 41 preferably has a cylindrical or substantially cylindrical shape. Preferably, the shape of the core back portion 41 is concentric with the shaft 31. The teeth portions 42 are disposed on an inner surface of the core back portion 41. Each teeth portion 42 extends from the inner surface of the core back portion 41 toward a radially inner side (that is, toward the shaft 31). Preferably, the teeth portions 42 are arranged at equal or substantially equal intervals in the inner surface of the core back portion 41 in the circumferential direction.

Preferably, the bobbin 44 is a cylindrical or substantially cylindrical member. Each bobbin 44 is respectively mounted on one of the teeth portions 42. Preferably, the bobbin is defined by at least two members engaged from an axial direction. Each coil 43 is disposed in each bobbin 44. Each coil 43 is provided preferably by winding a conductive wire 43a about a bobbin 44. Further, as the conductive wire 43a, a circular wire or a flat wire is preferably used.

The first bearing 51 is disposed at a front side (−Z side) of the stator 40. The first bearing 51 is held by the front bearing holding portion 21c. The second bearing 52 is disposed at the rear side (+Z side) opposite to the front side of the stator 40. The second bearing 52 is held by a rear bearing holding portion 65 of a bus bar holder 61 which will be described later.

The first bearing 51 and the second bearing 52 supports the shaft 31. According to this exemplary preferred embodiment, each of the first bearing 51 and the second bearing 52 is a ball bearing. However, the type of the first bearing 51 and the second bearing 52 is not particularly limited to the above bearing type. For example, different kinds of bearings such as a sleeve bearing and a fluid hydraulic bearing may also be used. Further, the type of bearing of the first bearing 51 may be different from that of the second bearing 52.

The oil seal 80 preferably is an annular or substantially annular member. The oil seal 80 is mounted in the oil seal holding portion 21d around the axis (in the θZ direction) of the shaft 31. In more detail, the oil seal 80 is disposed in the oil seal holding portion 21d. An end of an axial lower portion of the shaft 31 penetrates through the through-hole of the oil seal 80. The oil seal 80 is disposed between the oil seal holding portion 21d and the shaft 31. Therefore, the oil seal 80 prevents water, oil, etc., from infiltrating from a gap between the oil seal holding portion 21d and the shaft 31 into the housing 20. The oil seal 80 is preferably made of, for example, a resin material. However, a configuration and a material of the oil seal 80 are not limited thereto, and therefore an oil seal of different kinds of configurations and materials may also be used.

Figure 4:
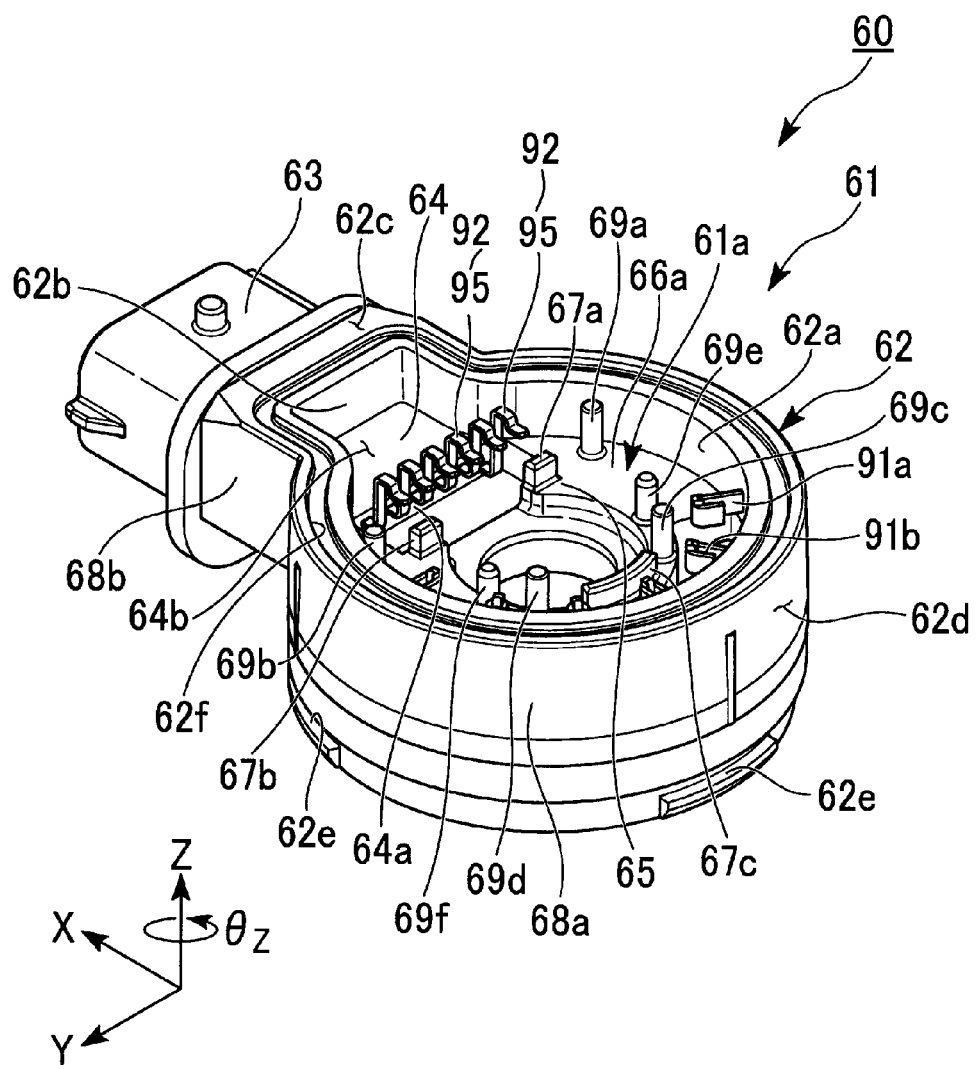
FIG. 4 is a perspective view illustrating a bus bar assembly according to a first preferred embodiment of the present invention.
Figure 5:
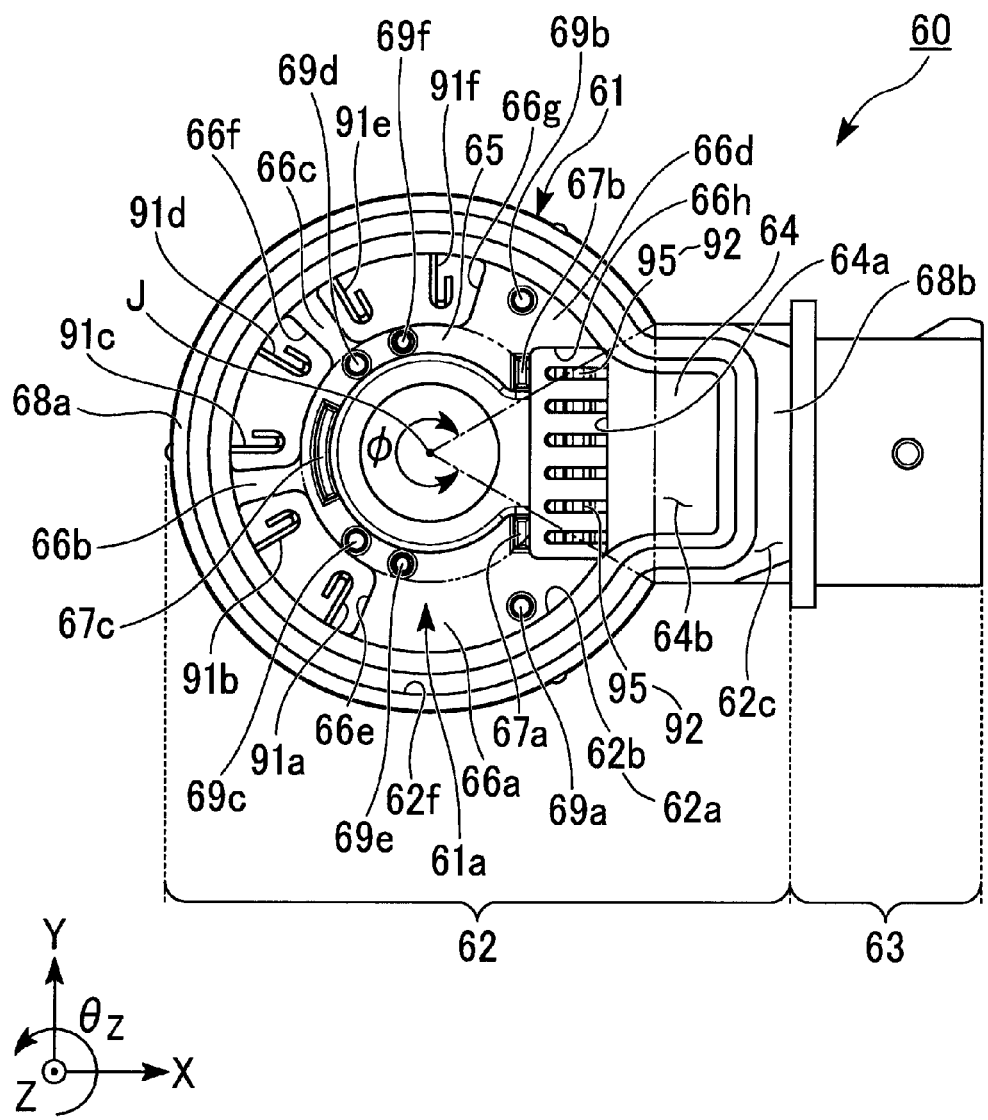
FIG. 5 is a plan view illustrating the bus bar assembly according to a first preferred embodiment of the present invention.

FIGS. 4 and 5 are views illustrating the bus bar assembly 60. FIG. 4 is a perspective view of the bus bar assembly 60. FIG. 5 is a plan view of the bus bar assembly 60. The bus bar assembly 60 supplies a driving current from the external power source, etc. to the stator 40. As illustrated in FIGS. 1, 4 and 5, the bus bar assembly 60 includes a bus bar holder 61, at least one bus bar 91, and a wiring member 92. Further, in this preferred embodiment, the bus bar assembly 60 includes a plurality of bus bars 91.

The bus bar holder 61 is preferably defined by a holder made of resin. Preferably, a material forming the bus bar holder is an electrically insulating resin. The bus bar holder 61 holds the bus bar 91 and the wiring member 92. As illustrated in FIG. 1, a rear side (+Z side) of the bus bar holder 61 is accommodated in the cylindrical portion 22a. In this preferred embodiment, the bus bar holder 61 is press-fitted into the cylindrical portion 22a. At least a portion of a front side (−Z side) of the bus bar holder 61 is accommodated in the bus bar assembly insertion portion 21a of the housing 21.

As long as a material forming the bus bar holder 61 has an insulation property, any material may be used without being specially limited. The bus bar holder 61 is preferably manufactured as a single monolithic member by, for example, injection molding. As illustrated in FIGS. 4 and 5, the bus bar holder 61 includes a main body portion 62, a connector portion 63, a connection terminal holding portion 64, a rear bearing holding portion 65, and connection portions 66a, 66b, 66c, and 66d.

As illustrated in FIGS. 1 and 4, the main body portion 62 preferably has a cylindrical or substantially cylindrical shape enclosing the center axis J in the circumferential direction (θZ direction). The main body portion 62 includes an opening 62a at the rear side (+Z side). The main body portion 62 encloses the end of the rear side of the rotor 30 and the end of the rear side of the stator 40 in the circumferential direction. That is, a portion of the rear side of the rotor 30 and the stator 40 are disposed in the front side (−Z side) of the main body portion 62.

A groove portion 62f is preferably disposed on a main body rear surface 62c. The groove portion 62f is provided along the contour of the main body portion 62 enclosing the opening 62a. A rear side O-ring 82 is fitted into the groove portion 62f. As illustrated in FIG. 4, the front side (−Z side) of the main body outer surface 62d is provided with an O-ring holding portion 62e. As illustrated in FIG. 1, the front side O-ring 81 is fitted into the front side O-ring holding portion 62e.

As illustrated in FIGS. 4 and 5, the main body portion preferably includes an arc portion 68a and a connector connection portion 68b. As illustrated in FIG. 5, the shape of a cross section (XY cross-section) perpendicular to the center axis J of the arc portion 68a and the shape of a plane view (XY plane view) is an arc shape concentric with the rear bearing holding portion 65. Preferably, a central angle of the arc shape may be φ240° or higher, for example. In this preferred embodiment, the arc portion 68a is preferably press-fitted into the cylindrical portion 22a of the cover 22.

As illustrated in FIGS. 4 and 5, the connector connection portion 68b is connected to the connector portion 63. Further, the connector connection portion 68b is connected to both ends of the arc portion 68a. The connector connection portion 68b preferably has a shape protruding toward the connector portion 63 (+_X side).

The connector portion 63 is a portion connected to an external power supply (not illustrated). The connector portion 63 preferably has a cylindrical or substantially cylindrical shape. The connector portion 63 also has a rectangular parallelepiped or substantially rectangular parallelepiped shape. The connector portion 63 extends from a portion of the outer surface of the connector connection portion 68b to the radially outer side (+X side) of the center axis J. The connector portion 63 includes an opening at the radially outer side (+X side). That is, the connector portion 63 protrudes from the main body portion 62 toward the radially outer side of the center axis J. As illustrated in FIG. 1, the entirety of the connector portion 63 is exposed outside the cover 22.

As illustrated in FIG. 1, the connector portion 63 includes an opening 63a for a power supply that opens toward one side (+X side) disposed in a longitudinal direction of the bus bar holder 61. A bottom surface of the power-supply opening 63a is preferably provided with the bus bar 91 and an external power-supply connection terminal 94, to be described later. The bus bar 91 and the external power-supply connection terminal 94 protrudes from the bottom surface of the power-supply opening 63a toward one side (+X side) disposed in the longitudinal direction of the bus bar holder 61.

As illustrated in FIGS. 4 and 5, the connection terminal holding portion 64 is a portion of a rectangular parallelepiped or substantially rectangular parallelepiped shape. The connection terminal holding portion 64 protrudes from the main body inner surface (inner surface) 62b toward the radially inner side. In more detail, as illustrated in FIG. 5, the connection terminal holding portion 64 extends from the inner surface of the connector connection portion 68b in the direction (−X direction) opposite to the direction in which the connector portion 63 extends. As illustrated in FIG. 1, the holding portion rear surface 64b is located at the front side (−Z side) ahead of the circuit board rear surface 71a. The holding portion rear surface 64b of the connection terminal holding portion 64 is located at the front side ahead of the main body rear surface 62c of the rear side of the main body portion 62.

The rear bearing holding portion 65 is disposed in the radially inner side of the main body portion 62. The rear bearing holding portion 65 holds the second bearing 52.

As illustrated in FIG. 5, the connection portions 66a, 66b, 66c, and 66d connect the main body portion 62 to the rear bearing holding portion 65 disposed in the main body portion 62. The connection portions 66a-66d are arranged at the circumference of the rear bearing holding portion 65 while being spaced apart from each other at equal or substantially equal intervals along the circumferential direction.

Gaps 66e, 66f, 66g, and 66h are defined among the connection portions 66a-66d neighboring with each other in the circumferential direction. That is, gaps 66e, 66f, 66g, and 66h are defined between the rear bearing holding portion 65 and the main body portion 62. The gap 66e is defined by the connection portion 66a, the connection portion 66b, the main body portion 62, and the rear bearing holding portion 65. The gap 66f is defined by the connection portion 66b, the connection portion 66c, the main body portion 62, and the rear bearing holding portion 65. The gap 66g is defined by the connection portion 66c, the connection portion 66d, the main body portion 62, and the rear bearing holding portion 65. The gap 66h is defined by the connection portion 66d, the rear bearing holding portion 65, the connection portion 66a, the connection terminal holding portion 64, and the main body portion 62.

In a plane view, the position of the gap 66e is a position which also includes coil connection portions 91a and 91b, described later. In a plane view, the position of the gap 66f is a position including coil connection portions 91c and 91d, described later. In a plane view, the position of the gap 66g is a position including coil connection portions 91e and 91f, described later. In a plane view, the position of the gap 66h is a position including a circuit board connection terminal 95, described later. In a plane view, the gap 66h preferably has a rectangular or substantially rectangular shape.

As illustrated in FIGS. 4 and 5, the bottom portion 61a is defined by a connection terminal holding portion 64, a rear bearing holding portion 65, and connection portions 66a-66d. That is, the bus bar holder 61 includes the bottom portion 61a. The bottom portion 61a widens from the main body inner surface 62b toward the radially inner side.

As illustrated in FIG. 3, the bottom portion 61a is divided into two regions by a division line C1. The division line C1 is perpendicular or substantially perpendicular to the protrusion direction (X-axis direction) and the axial direction (Z-axis direction) of the connector portion 63, and crosses the center axis J. In the present preferred embodiment, the extension direction of the division line C1 is parallel or substantially parallel to the arrangement direction of the circuit board connection terminal 95, described later. Further, in the following description, the direction parallel to the direction of C1 will simply be referred to as a division-line direction (Y-axis direction).

In the bottom portion 61a, a region of a specific side (+X side) in which the circuit board connection terminal 95 (described later) of the division line C1 is provided in a plane view (XY plane view) will hereinafter be referred to as a first region AR1. That is, the first region AR1, in the bottom portion 61a, when viewed from the axial direction (Z-axis direction), is a region of the side (+X side) in which the circuit board connection terminal 95 is provided on the basis of the center axis J.

In the bottom portion 61a, a region of the other side (−X side) opposite to the above side at which the circuit board connection terminal 95 (described later) of the division line C1 is provided in the plane view will hereinafter be referred to as a second region AR2. That is, the second region AR2, in the bottom portion 61a, when viewed from the axial direction (Z-axis direction), is a region of the side (−X side) opposite to the side at which the circuit board connection terminal 95 is provided on the basis of the center axis J.

First circuit board support portions 67a and 67b, the second circuit board support portion 67c, a plurality of protrusion portions extending from the bottom portion 61a toward the rear side, and bus bar holder convex portions 69e and 69f are disposed at the surface of the rear side (+Z side) of the bottom portion 61a. That is, the bus bar holder 61 includes first circuit board support portions 67a and 67b, the second circuit board support portion 67c, a plurality of protrusion portions extending from the bottom portion 61a toward the rear side, and bus bar holder convex portions 69e and 69f. The plurality of protrusion portions includes first protrusion portions 69a and 69b and second protrusion portions 69c and 69d.

As illustrated in FIG. 4, the first circuit board support portions 67a and 67b extend from the bottom portion 61a toward the rear side (+Z side). As illustrated in FIG. 2, the first circuit board support portion 67b supports the circuit board 71 from the front side (−Z side). That is, the end of the rear side of the first circuit board support portion 67b contacts the circuit board front surface 71b. The end of the rear side of the first circuit board support portion 67b can also be applied to the first circuit board support portion 67a.

As illustrated in FIG. 3, the first circuit board support portions 67a and 67b are disposed in the first region AR1. The first circuit board support portions 67a and 67b and a contact portion 95e to be described later are arranged at different positions when viewed from the axial direction (Z-axis direction). In the present preferred embodiment, the first circuit board support portions 67a and 67b are disposed between the shaft 31 and the contact portion 95e in the radial direction.

As illustrated in FIG. 5, in the present preferred embodiment, the first circuit board support portions 67a and 67b are disposed at the surface of the rear side (+Z side) of the rear bearing holding portion 65 from among elements of the bottom portion 61a. The first circuit board support portions 67a and 67b are disposed at the edge of the center axis J (−X side) of a gap 66h.

As illustrated in FIG. 3, the first circuit board support portion 67a and the first circuit board support portion 67b are preferably arranged along the division-line direction (Y-axis direction). In the division-line direction, the first circuit board support portion 67a is arranged at the same position as the end of the +Y side of the connection terminal holding portion 64. In the division-line direction, the first circuit board support portion 67b is provided at the same position as the end of the −Y side of the connection terminal holding portion 64.

A portion of the first circuit board support portion 67a is disposed at one side (+Y side) of the plurality of contact regions 95e in the division-line direction (Y-axis direction), i.e., in the arrangement direction (predetermined direction) of the contact portion 95e of the circuit board connection terminal 95, to be described later. A portion of the first circuit board support portion 67b is disposed at the other side (−Y side) of the plurality of contact portions 95e in the division-line direction.

In FIG. 3, the plane view shape of the first circuit board support portions 67a and 67b preferably is rectangular or substantially rectangular. The plane view (XY plane view) shape of the first circuit board support portions 67a and 67b is not limited to the above shapes. The plane view (XY plane view) shape of the first circuit board support portions 67a and 67b may be, for example, a circular shape, a rectangular shape, and a polygonal shape. The first circuit board portions 67a, 67b extend along the division-line direction (Y-axis direction). That is, the first circuit board portions 67a, 67b extend along the arrangement direction (predetermined direction) of the contact portion 95e of the circuit board connection terminal 95 to be described later.

As illustrated in FIG. 4, the second circuit board support portion 67c extends from the bottom portion 61a to the rear side (+Z side). As illustrated in FIG. 2, the second circuit board support portion 67c supports the circuit board 71 from the front side (−Z side). That is, the end of the rear side of the second circuit board support portion 67c contacts the circuit board front surface 71b.

As illustrated in FIG. 3, the second circuit board support portion 67c is preferably disposed in the second region AR2. As illustrated in FIG. 5, the second circuit board support portion 67c is disposed at the surface of the rear side (+Z side) of the rear bearing support portion 65 from among elements of the bottom portion 61a. In FIG. 3, the plane view shape of the second circuit board support portion 67c is a shape extending in the circumferential direction. The plane view (XY plane view) shape of the second circuit board support portion 67c is not limited to the above-mentioned shape in the same manner as in the first circuit board support portions 67a and 67b. The second circuit board support portion 67c is located at the same position as the center portion of the connection terminal holding portion 64 in the division-line direction (Y-axis direction).

As illustrated in FIG. 4, the first protrusion portions 69a and 69b preferably extend from the bottom portion 61a to the rear side (+Z side). The shape of the first protrusion portions 69a and 69b preferably is cylindrical or substantially cylindrical. The shape of the first protrusion portions 69a and 69b is not limited thereto. For example, the first protrusion portions 69a and 69b may be a cylindrical shape, a square pillar shape, or a polygonal pillar shape.

As illustrated in FIG. 3, the first protrusion portions 69a and 69b are preferably disposed along the division-line direction (Y-axis direction). The first protrusion portions 69a and 69b are disposed in the first region AR1. As illustrated in FIG. 5, the first protrusion portion 69a is disposed at the connection portion 66a from among elements of the bottom portion 61a. The first protrusion portion 69b is disposed at the connection portion 66d from among elements of the bottom portion 61a.

The radial distance between the first protrusion portion 69a and the center axis J is longer than the radial distance between the ends of the radially inner sides of the coil connection portions 91a-91f to be described later and the center axis J. That is, the first protrusion portion 69a is arranged at the radially outer side ahead of the end of the radially inner side of the coil connection portions 91a-91f. When viewed from the axial direction (Z-axis direction), the first protrusion portion 69a overlaps with at least a portion of the coil connection portions 91a-91f in the circumferential direction. The above description may also be equally applied to the first protrusion portion 69b. As illustrated in FIG. 3, the first protrusion portions 69a and 69b are respectively inserted into first notch portions 74a and 74b of the circuit board 71 to be described later.

As illustrated in FIG. 2, the end of the rear side (+Z side) of the first protrusion portion 69b is disposed at the rear side ahead of the circuit board 71. In the first protrusion portion 69b, a portion protruding toward the rear side ahead of the circuit board rear surface 71a is dissolved by heat such that the protruding portion is deposited on the circuit board rear surface 71a. That is, the first protrusion portion 69b is deposited on the circuit board rear surface 71a. The deposited portion of the first protrusion portion 69b preferably has a hemispheric or substantially hemispheric shape. The above description is also equally applied to the first protrusion portion 69a. With this, the first protrusion portions 69a and 69b are fixed to the circuit board 71. As a result, the first protrusion portions 69a and 69b are able to support the circuit board 71 from the rear side.

As illustrated in FIG. 4, the second protrusion portions 69c and 69d extend from the bottom portion 61a toward the rear side (+Z side). In FIG. 4, the shape of the second protrusion portions 69c and 69d may be cylindrical or substantially cylindrical. The shape of the second protrusion portions 69c and 69d is not limited thereto. For example, the second protrusion portions 69c and 69d may have a cylindrical or substantially cylindrical shape, a square pillar shape, a polygonal pillar shape, etc.

As illustrated in FIG. 3, the second protrusion portions 69c and 69d are preferably arranged along the division-line direction (Y-axis direction). The second protrusion portions 69c and 69d are disposed in the second region AR2. In the present preferred embodiment, the second protrusion portions 69c and 69d are disposed in the rear bearing holding portion 65 from among elements of the bottom portion 61a. As illustrated in FIG. 3, the second protrusion portions 69c and 69d are respectively inserted into the second notch portions 74c and 74d of the circuit board 71 to be described later.

As illustrated in FIG. 2, the end of the rear side (+Z side) of the second protrusion portion 69d is located at the rear side ahead of the circuit board 71. In the second protrusion portion 69d, a portion protruding toward the rear side ahead of the circuit board rear surface 71a is dissolved by heat such that the protruding portion is deposited on the circuit board rear surface 71a. That is, the second protrusion portion 69d is deposited on the circuit board rear surface 71a. For example, the deposited portion of the second protrusion portion 69d preferably has a hemispheric or substantially hemispheric shape. The above description is also equally applied to the second protrusion portion 69c. With this, the second protrusion portions 69c and 69d are fixed to the circuit board 71. As a result, the second protrusion portions 69c and 69d support the circuit board 71 from the rear side.

As illustrated in FIG. 4, the bus bar holder convex portions 69e and 69f extend from the bottom portion 61a to the rear side (+Z side). As illustrated in FIG. 3, the bus bar holder convex portions 69e and 69f are preferably arranged along the division-line direction (Y-axis direction). In the present preferred embodiment, the bus bar holder convex portions 69e and 69f are disposed in the second region AR2. The bus bar holder convex portions 69e and 69f are respectively inserted into circuit board hole portions 77a and 77b provided in the circuit board 71, which will be described later. In more detail, the ends of the rear sides of the bus bar holder convex portions 69e and 69f are respectively inserted into the circuit board hole portions 77a and 77b.

The bus bar 91 is preferably a thin plate-shaped member made of a conductive material (for example, metal, etc.). The bus bar 91 is directly or indirectly electrically connected to the stator 40. The driving current is supplied from an external power supply or the like to the stator 40 through the bus bar 91. Although not shown in the drawings, according to this preferred embodiment of the present invention, the plurality of bus bars 91 is mounted to the stator 40. For example, if the motor is a three-phase motor, at least three bus bars 91 are preferably mounted to the stator 40. According to a difference in coil wiring methods, the number of bus bars 91 may be changed to 4 or higher. Each bus bar 91 is preferably disposed in the bus bar holder 61. As illustrated in FIG. 1, One end of the bus bar 91 protrudes from the bottom surface of the power-supply opening 63a. One end of the bus bar 91 is exposed outside the cover 22. For example, the external power supply is connected to one end of the bus bar 91 exposed outside the cover 22.

As illustrated in FIG. 5, the plurality of bus bars 91 include coil connection portions 91a, 91b, 91c, 91d, 91e, and 91f. The coil connection portions 91a-91f are disposed at the other end of the plurality of bus bars 91. The coil connection portions 91a-91f protrude from the main body inner surface 62b. In more detail, the coil connection portions 91a-91f protrude from the inner surface of the arc portion 68a of the main body inner surface 62b toward the radially inner side. The coil connection portion 91c illustrated in FIG. 2 is electrically connected to the coil 43 through a connection member (not illustrated). With this, the bus bar 91 is electrically connected to the stator 40. In the above description, the coil connection portions 91a, 91b, and 91d-91f are preferably identical in structure to the coil connection portion 91c.

The wiring member 92 is held by the bus bar holder 61. Some portion of the wiring member 92 is preferably embedded in the bus bar holder 61. The wiring member 92 electrically connects the external power supply (not illustrated) to the circuit board 71. A plurality of wiring members 92 are preferably provided. In other words, the bus bar assembly 60 preferably includes a plurality of wiring members 92. The wiring member 92 includes the external power-supply connection terminal 94 and the plurality of circuit board connection terminals 95. The external power-supply connection terminal 94 and the circuit board connection terminal 95 are exposed from the bus bar holder 61.

The external power-supply connection terminal 94 is preferably disposed in the connector portion 63. The external power-supply connection terminal 94 protrudes from the bottom surface of the power-supply opening 63a. The external power-supply connection terminal 94 is electrically connected to the external power supply (not illustrated).

As illustrated in FIG. 3, the circuit board connection terminal 95 preferably extends from the holding portion inner surface 64a. The plurality of circuit board connection terminals 95 are arranged in a predetermined direction at the circuit board rear surface 71a. For example, the plurality of circuit board connection terminals 95 are arranged along the division-line direction (Y-axis direction). As illustrated in FIG. 2, the circuit board connection terminal 95 preferably includes a first connection portion 95a, a first extension portion 95b, a second connection portion 95c, a second extension portion 95d, and a contact portion 95e.

The first connection portion 95a protrudes from the holding portion inner surface 64a toward the radially inner side. The first connection portion 95a is located at the radially outer side ahead of the circuit board 71. The first extension portion 95b extends from the end of the radially inner side of the first connection portion 95a toward the rear side (+Z side). The first extension portion 95b extends to the rear side of the circuit board 71.

The second connection portion 95c extends from the end of the rear side (+Z side) of the first extension portion 95b toward the radially inner side. The second extension portion 95d extends from the end of the radially inner side of the second connection portion 95c toward the front side (−Z side). The end of the front side of the second extension portion 95d is disposed at the rear side (+Z side) ahead of the end of the front side of the first extension portion 95b.

The contact portion 95e extends from the end of the front side (−Z side) of the second extension portion 95d toward the radially inner side. The contact portion 95e is disposed at the end of the radially inner side of the circuit board connection terminal 95. The contact portion 95e preferably has a plate shape, and includes a contact surface 95f parallel to the circuit board rear surface 71a at the front side.

As illustrated in FIG. 3, the contact portion 95e is preferably arranged along the division-line direction (Y-axis direction) within the circuit board rear surface 71a. The contact portion 95f contacts the circuit board rear surface 71a. For example, the contact portion 95e is preferably fixed to the circuit board 71 by soldering (not illustrated). With this, the contact portion 95e is connected to the circuit board 71. That is, the circuit board connection terminal 95 is electrically connected to the circuit board rear surface 71a. In conclusion, the wiring member 92 is electrically connected to the circuit board 71.

The circuit board connection terminal 95 applies force to the circuit board 71 in the direction from the rear side (+Z side) to the front side (−Z side) through the contact portion 95e. That is, under the condition that the circuit board 71 is removed, the contact surface 95f at the contact portion 95e is disposed at the front side ahead of the circuit board rear surface 71a in the axial direction (Z-axis direction).

As illustrated in FIG. 2, under the condition that the circuit board connection terminal 95 is connected to the circuit board 71, the circuit board connection terminal 95 is elastically deformed in the axial direction (Z-axis direction). The first extension portion 95b extends in the axial direction, resulting in increase of the axial numerical value. The second extension portion 95d is reduced in size in the axial direction, resulting in a reduction of the axial numerical value of the second extension portion 95d.

As illustrated in FIG. 5, in the present preferred embodiment, the circuit board connection terminal 95 and the coil connection portions 91a-91f are disposed at different positions in the circumferential direction (θZ direction) of the center axis J.

The controller 70 controls driving of the motor 10. As illustrated in FIG. 2, the controller 70 preferably includes the circuit board 71, a rotation sensor 72, a sensor magnet holding member 73a, and a sensor magnet 73b. That is, the motor 10 includes the circuit board 71, the rotation sensor 72, the sensor magnet holding member 73a, and the sensor magnet 73b.

The circuit board 71 is preferably disposed on an extending line of the rear side (+Z side) of the shaft 31. The circuit board 71 is disposed between the second bearing 52 and the cover 22 in the axial direction (Z-axis direction). The circuit board 71 includes a circuit board rear surface 71a located at the rear side and a circuit board front surface 71b located at the front side (−Z side). The circuit board rear surface 71a and the circuit board front surface 71b are a main surface of the circuit board 71. That is, the circuit board front surface 71b and the circuit board rear surface 71a crosses the center axis (Z-axis). In the present preferred embodiment, the main surface of the circuit board 71 is perpendicular or substantially perpendicular to the center axis. The circuit board rear surface 71a faces the cover front surface 22c.

As illustrated in FIG. 3, the circuit board 71 is supported from the front side (−Z side) by the first circuit board support portions 67a and 67b and the second circuit board support portion 67c. At least one side of the main surface of the circuit board 71 is preferably provided with a printed wiring (not illustrated). The circuit board 71 outputs, for example, a motor driving signal.

Figure 6:
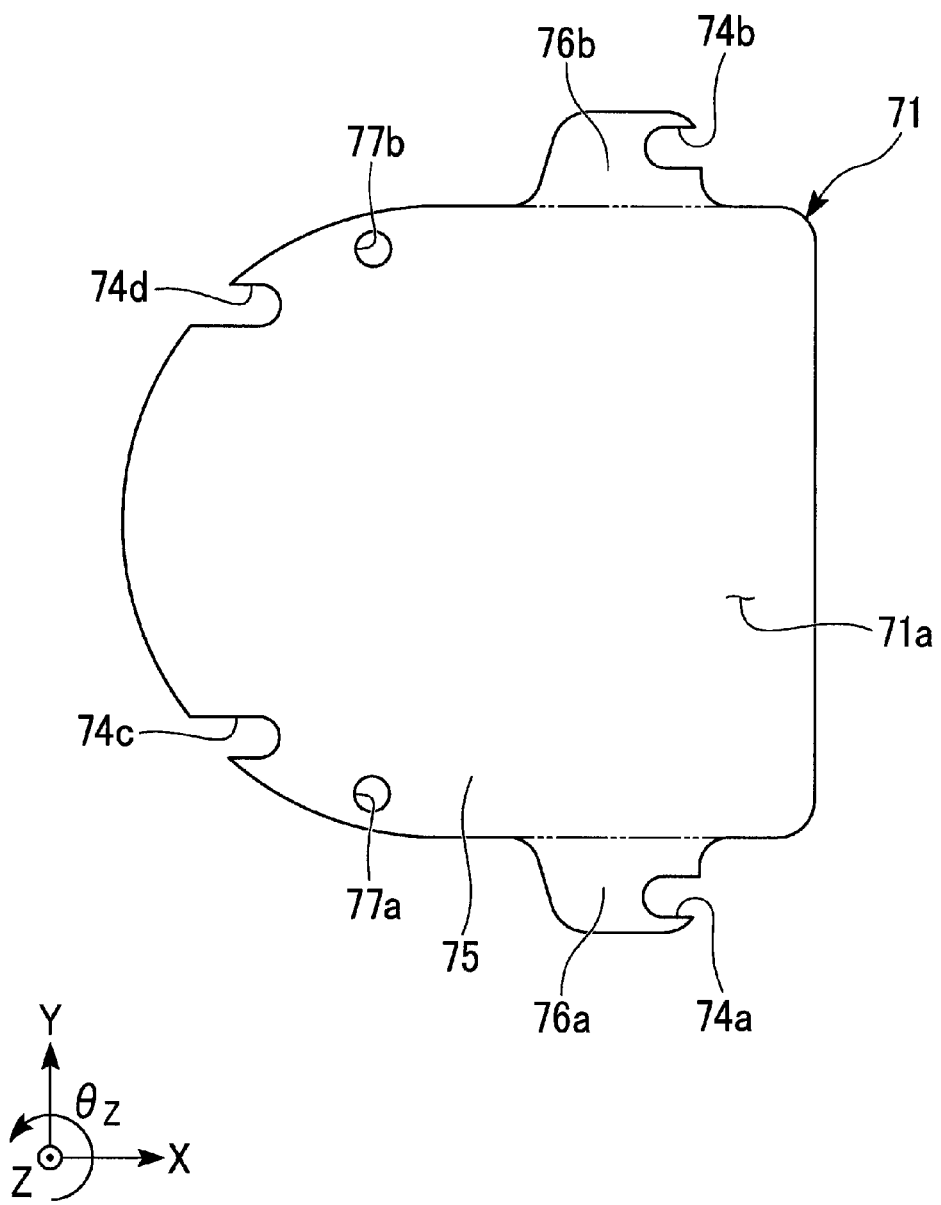
FIG. 6 is a plan view illustrating a circuit board according to a first preferred embodiment of the present invention.

FIG. 6 is a plan view illustrating the circuit board 71 according to a preferred embodiment of the present invention. As illustrated in FIG. 6, the circuit board 71 preferably includes a circuit board main body 75 and circuit board convex portions 76a and 76b.

As illustrated in FIG. 6, the shape of the circuit board main body 75 in the plane view preferably is a shape combining a semicircle and a square having a rounded edge. The plane-view (XY-plane view) shape of the circuit board main body 75 is not limited thereto. The plane-view (XY-plane view) shape of the circuit board main body 75 may be, for example, a circular shape, a rectangular shape, or other shapes. As illustrated in FIG. 3, a plurality of contact portions 95e are connected to the end of the connector portion 63 (+X side) at the circuit board rear surface 71a. That is, the circuit board connection terminal 95 is connected to the circuit board rear surface 71a. In the present preferred embodiment, the circuit board connection terminal 95 is preferably arranged along the division-line direction (Y-axis direction).

The second notch portions 74c and 74d are arranged at the end of the opposite side (−X side) of the connector portion 63. That is, the second notch portions 74c and 74d are arranged at the outer edge of the circuit board 71.

In the present preferred embodiment, the second notch portions 74c and 74d preferably extend in the protrusion direction (X-axis direction) of the connector portion 63. The second notch portions 74c and 74d are opened toward the direction (−X direction) from the main body portion 62 to a direction opposite to the protrusion direction of the connector portion 63. The second notch portions 74c and 74d are opened in the direction opposite to the first notch portions 74a and 74b to be described later.

Further, "opened direction of the notch portion" includes the direction from the end of the bottom side of the notch portion to the end of the opening side of the notch portion.

In FIG. 6, in the plane view, the shape of the end of the bottom side (+X side) at the second notch portions 74c and 74d is a shape corresponding to the shape of the second protrusion portions 69c and 69d of the plane view. That is, the plane-view shape of the end of the bottom side (+X side) at the second notch portions 74c and 74d is the arc shape. Further, the plane-view (XY plane view) shape of the second notch portions 74c and 74d is not limited thereto.

As illustrated in FIG. 3, the second protrusion portion 69c is inserted into the second notch portion 74c. The inner edge of the end of the bottom side (+X side) of the second notch portion 74c contacts the second protrusion portion 69c. The second protrusion portion 69d is inserted into the second notch portion 74d. The inner edge of the end of the bottom side (+X side) of the second notch portion 74d contacts the second protrusion portion 69d.

The circuit board hole portions 77a and 77b are disposed in the circuit board main body 75. As illustrated in FIG. 3, the bus bar holder convex portion 69e is inserted into the circuit board hole portion 77a. The bus bar holder convex portion 69f is inserted into the circuit board hole portion 77b. As illustrated in FIG. 6, the plane-view (XY plane view) shape of the circuit board hole portions 77a and 77b preferably has a circular or substantially circular shape. The plane-view (XY plane view) shape of the circuit board hole portions 77a and 77b is not limited thereto.

As illustrated in FIG. 6, the circuit board convex portion 76a protrudes from the circuit board main body 75 toward the −Y side of the arrangement direction (Y-axis direction) of the circuit board connection terminal 95. The circuit board convex portion 76b protrudes from the circuit board main body 75 toward the +Y side of the arrangement direction of the circuit board connection terminal 95. That is, the circuit board convex portions 76a and 76b preferably protrude from both ends of the arrangement direction of the circuit board connection terminal 95 toward the opposite side of the circuit board main body 75. The shape of the circuit board convex portions 76a and 76b is not limited thereto.

The first notch portion 74a is disposed at the circuit board convex portion 76a. The first notch portion 74b is disposed at the circuit board convex portion 76b. That is, the first notch portions 74a and 74b are preferably disposed at the outer edge of the circuit board 71.

The first notch portions 74a and 74b extend in the protrusion direction (X-axis direction) of the connector portion 63. The first notch portions 74a and 74b are opened toward the direction from the center axis J to the circuit board connection terminal 95 when viewed from the axial direction (Z-axis direction). In more detail, the first notch portions 74a and 74b are opened toward the direction from the main body portion 62 to the protrusion direction (+X direction) of the connector portion 63. As described above, the opened direction of the first notch portions 74a and 74b is opposite to the opened direction of the second notch portions 74c and 74d.

In FIG. 6, the plane-view shape of the end of the bottom side (−X side) at the first notch portions 74a and 74b is a shape corresponding to a plane-view shape of the first protrusion portions 69a and 69b, that is, an arc shape. The plane-view (XY plane view) shape of the first notch portions 74a and 74b is not limited thereto.

As illustrated in FIG. 3, the first protrusion portion 69a is inserted into the first notch portion 74a. The inner edge of the end of the bottom side (−X side) of the first notch portion 74a contacts the first protrusion portion 69a. The first protrusion portion 69b is inserted into the first notch portion 74b. The inner edge of the edge of the bottom side (−X side) of the first notch portion 74b contacts the first protrusion portion 69b.

As described above, the circuit board 71 is supported, from the front side (−Z side), by the first circuit board support portions 67a and 67b and the second circuit board support portion 67c. The first protrusion portions 69a and 69b and the second protrusion portions 69c and 69d are deposited on the circuit board 71. The bus bar holder convex portions 69e and 69f are inserted into the circuit board hole portions 77a and 77b. As a result, the circuit board 71 is fixed to the bus bar holder 61.

As illustrated in FIG. 2, the sensor magnet holding member 73a is preferably an annular or substantially annular member. A small diameter of the end of the rear side (+Z side) of the shaft 31 is inserted into a hole at a center of the sensor magnet holding member 73a. With this, the position of the sensor magnet holding member 73a is determined on the basis of the shaft 31. Preferably, the sensor magnet holding member 73a is fixed to the shaft 31 by press-fit, adhesion, etc. The sensor magnet holding member 73a may rotate along with the shaft 31.

The sensor magnet 73b preferably has an annular or substantially annular shape. An N pole and an S pole of the sensor magnet 73b are alternately disposed alternately in the circumferential direction. The sensor magnet 73b is fitted on an outer circumferential surface of the sensor magnet holding member 73a. In more detail, at least a portion of the sensor magnet 73b contacts the outer circumferential surface of the sensor magnet holding member 73a. With this, the sensor magnet 73b is held by the sensor magnet holding member 73a. As a result, the sensor magnet 73b is disposed at the circumference (±θZ direction) of the shaft 31 in the rear side (+Z side) of the second bearing 52 in such a manner that the sensor magnet 73b is able to rotate along with the shaft 31.

At least one rotation sensor 72 is preferably mounted on the front surface 71b of the circuit board. The rotation sensor faces the sensor magnet 73b in the axial direction (Z-axis direction). The rotation sensor 72 detects the position of the rotor depending on a change in magnetic flux of the sensor magnet 73b. Although not illustrated, according to this preferred embodiment, three rotation sensors 72 preferably are disposed on, for example, the front surface 71b of the circuit board. In the present preferred embodiment, the rotation sensor 72 is preferably a hall device. The rotation sensor 72 may be implemented as another sensor other than the hall device, such as, for example, a regulator or encoder.

As illustrated in FIG. 1, the front side O-ring 81 is disposed in the housing 21. The front side O-ring 81 is held by the O-ring holding portion 62e of the bus bar holder 61. The front side O-ring 81 preferably contacts the inner surface of the housing and the outer surface of the main body portion 62 along a circumference. That is, the front side O-ring 81 contacts the main body portion 62 and the housing 21 along a circumference. Stress generated from the inner surface of the bus bar assembly insertion portion 21a is loaded on the front side O-ring 81.

The rear side O-ring 82 is disposed in the cover 22. The rear side O-ring 82 is fitted into the groove portion 62f. The cover 22 includes a cover front surface 22c at the front side (−Z side) of the cover portion 22b. The entire circumference of the rear side O-ring 82 contacts the cover front surface 22c. Stress generated from the cover front surface 22c is loaded on the rear side O-ring 82.

In this preferred embodiment, the front side O-ring 81 and the rear side O-ring 82 is preferably made of, for example, resin including silicon rubber or the like. In this case, the front side O-ring 81 and the rear side O-ring 82 is preferably manufactured by, for example, machining elongated silicon rubber having a round cross section in a ring shape. However, a configuration and a material of the front side O-ring 81 and the rear side O-ring 82 are not particularly limited thereto.

The cover 22 is mounted to the rear side (+Z side) of the housing 21. The cover 22 is preferably made of, for example, metal. More specifically, as the material of the cover 22, for example, aluminum or an iron alloy such as SUS is preferably used. As described above, the cover 22 preferably includes a cylindrical portion 22a, a cover portion 22b, a cover front surface 22c, and a rear side flange portion 24.

The cylindrical portion 22a is opened toward the front side (−Z side). The cylindrical portion 22a encloses the bus bar assembly 60 from the radially outer side of the center axis J. In more detail, the cylindrical portion 22a encloses the end of the rear side (+Z side) of the main body portion 62 from the radially outer side of the center axis J. In other words, at least a portion of the end of the rear side (+Z side) of the main body portion 62 is disposed in the cylindrical portion 22a. The cylindrical portion 22a is connected to the end of the rear side (+Z side) of the bus bar assembly insertion portion 21a through the front side flange portion 23 and the rear side flange portion 24.

The cover portion 22b is connected to the end of the rear side (+Z side) of the cylindrical portion 22a. In the present preferred embodiment, the cover portion 22b preferably has a plate shape. The cover portion 22b has the cover front surface 22c at the front side (−Z side). The cover portion 22b closes the opening 62a. That is, the cover 22 covers the rear side of the opening 62a. The cover front surface 22c contacts the entire circumference of the rear side O-ring 82. With this, the cover 22 indirectly contacts the main body rear surface 62c through the rear side O-ring 82 over one circumferential round of the opening 62a.

The rear side flange portion 24 widens from the end of the front side (−Z side) of the cylindrical portion 22a toward the radially outer side. At least a portion of the front side flange portion 23 and at least a portion of the rear side flange portion 24 are bonded to each other while overlapping with each other, such that the housing 21 is bonded to the cover 22.

For example, the external power supply is connected to the motor 10 through the connector portion 63. The bus bar 91 protrudes from the bottom surface of the power-supply opening 63a. The connected external power supply is electrically connected to the bus bar 91 and the wiring member 92. With this, the driving current is supplied from the external power supply to the coil 43 and the rotation sensor 72 through the bus bar 91 and the wiring member 92. The rotation sensor 72 detects the magnetic flux of the rotor magnet. The driving current supplied to the coil 43 is controlled depending on the rotating position of the rotor 30 calculated based on, for example, the detected magnetic flux of the rotor magnet. When the driving current is supplied to the coil 43, a magnetic field is generated in the coil 43. In other words, when the driving current is supplied to the coil 43, a torque is generated between the rotor 30 and the stator 40. With this torque, the rotor 30 with the shaft 31 rotates. By doing so, the motor 10 obtains a rotational driving force.

Figure 7:
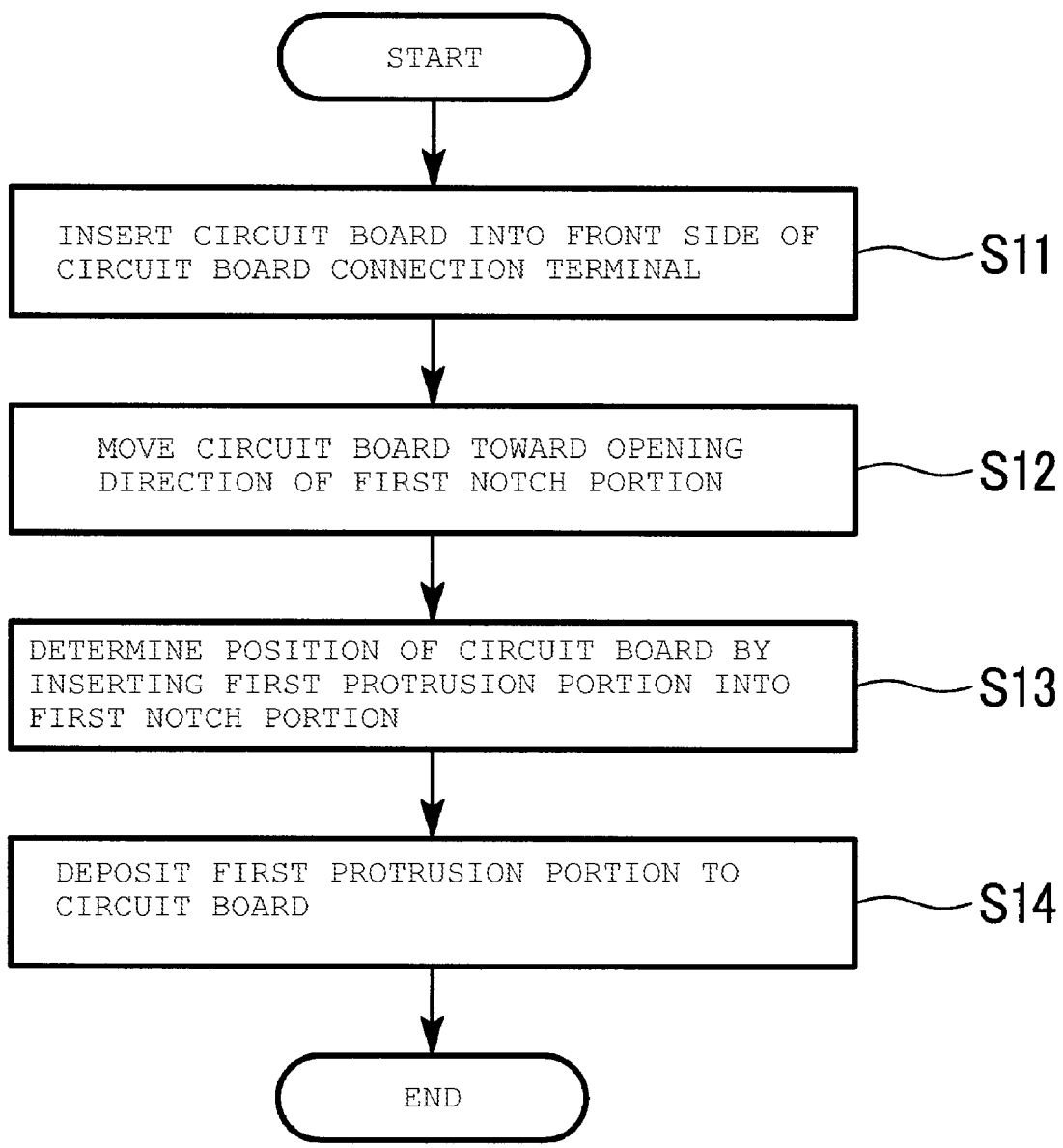
FIG. 7 is a flowchart illustrating a procedure of an arrangement process of the circuit board according to a first preferred embodiment of the present invention.
Figure 12:
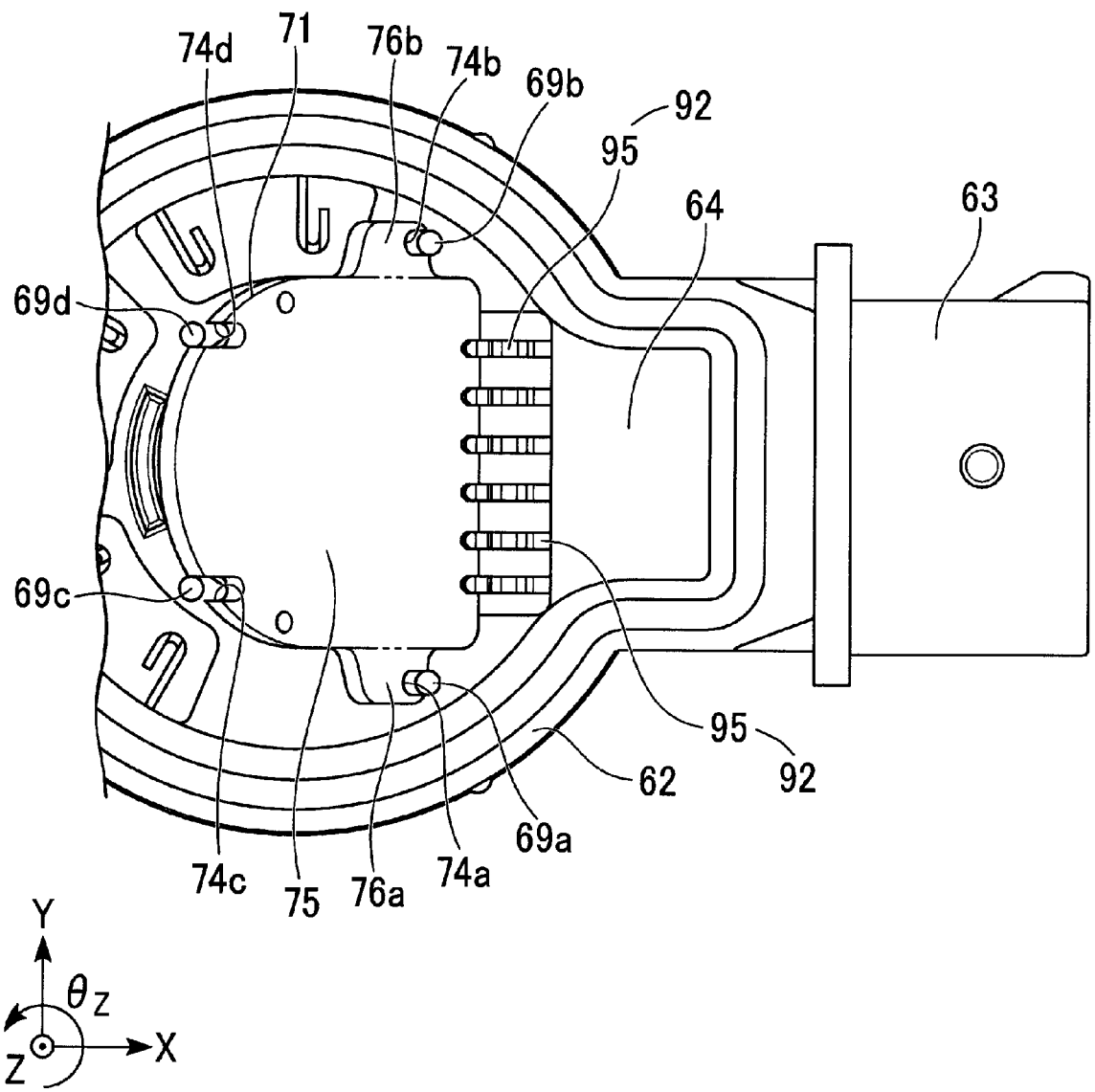
FIG. 12 is a plan view illustrating some of the procedures of an arrangement process of the circuit board according to a first preferred embodiment of the present invention.
Figure 13:
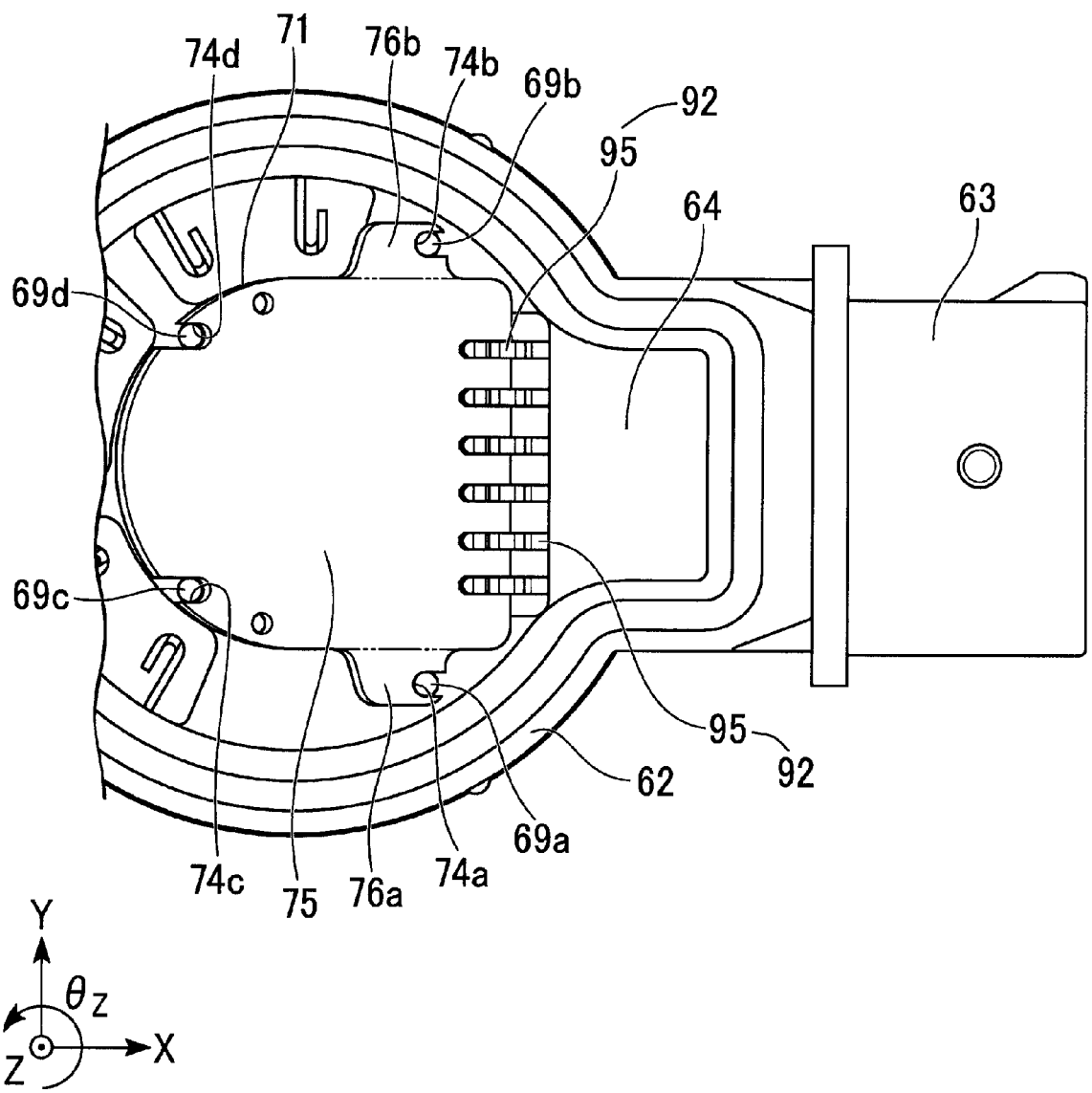
FIG. 13 is a plan view illustrating some of the procedures of an arrangement process of the circuit board according to a first preferred embodiment of the present invention.

A method of manufacturing the motor 10 of the first preferred embodiment will now be described. In the present preferred embodiment, only a process of arranging the circuit board 71 from among the method of manufacturing the motor 10 will be described in great detail. FIG. 7 is a flowchart illustrating a procedure of the arrangement process of the circuit board 71 in the motor 10. FIGS. 8 to 11 are a cross-sectional view illustrating the procedure of the arrangement process of the circuit board 71. FIGS. 12 and 13 are plan views illustrating some of the arrangement process of the circuit board 71. FIG. 12 is a view illustrating the same states as in FIG. 8. FIG. 13 is a view illustrating the same states as in FIG. 9.

Figure 8:
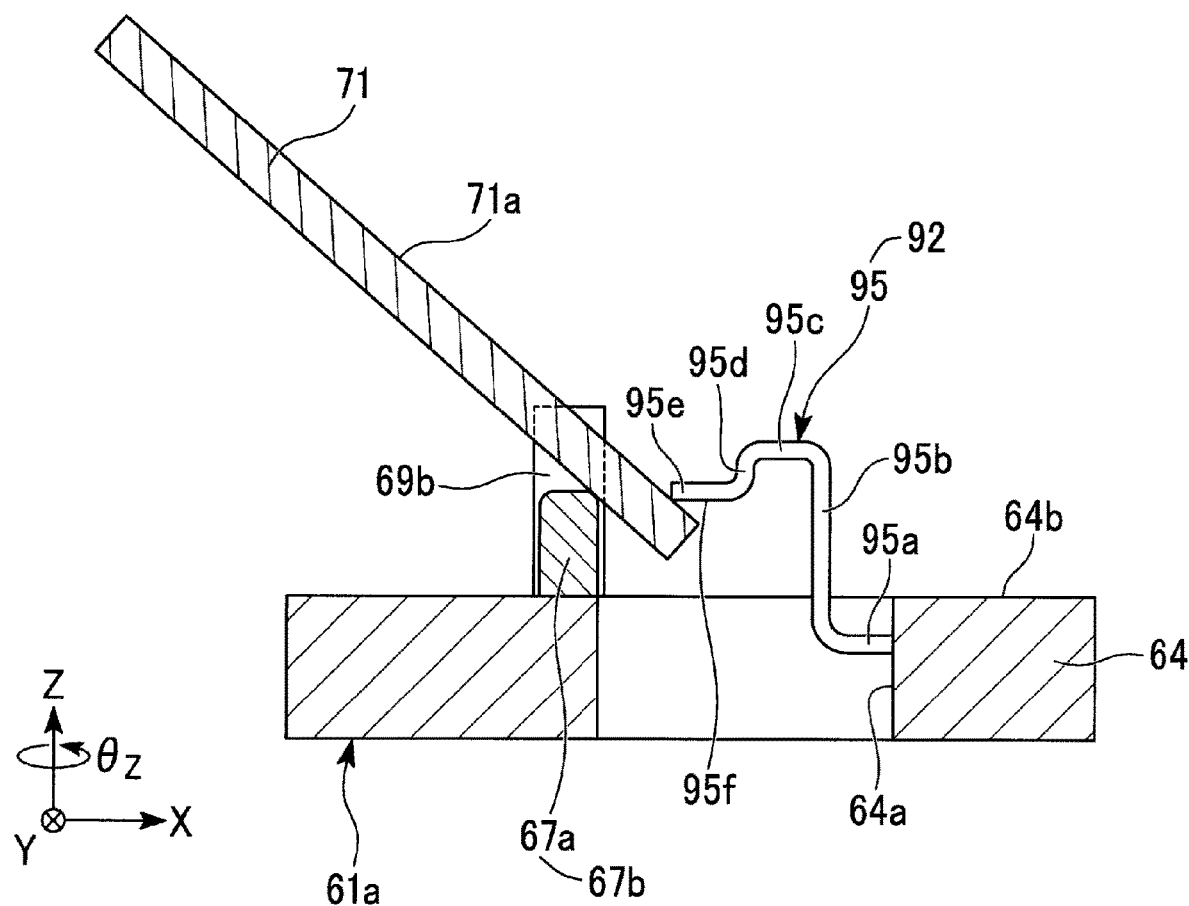
FIG. 8 is a cross-sectional view illustrating some of the procedures of an arrangement process of the circuit board according to a first preferred embodiment of the present invention.

As illustrated in FIG. 7, the arrangement process of the circuit board 71 according to the present preferred embodiment preferably includes an inserting process S11, a moving process S12, a position-determining process S13, and a fixing process S14. As illustrated in FIGS. 8 and 12, the inserting process S11 is a process of inserting the circuit board 71 into the front side (−Z side) of the circuit board connection terminal 95.

As illustrated in FIG. 8, the circuit board 71 is tilted with respect to the axial direction (Z-axis direction). The end of the circuit board 71 disposed at the connector portion 63 (+X side) is inserted between the first circuit board support portions 67a and 67b and the contact portion 95e of the circuit board connection terminal 95. As a result, the end of the circuit board 71 disposed at the connector portion 63 is inserted into the front side (−Z side) of the circuit board connection terminal 95.

As illustrated in FIGS. 8, 9, 12, and 13, the moving process S12 is a process of moving the circuit board 71 to the opening direction of the first notch portions 74a and 74b. The moving process S12 moves the circuit board 71 toward the opening direction of the first notch portions 74a and 74b, that is, moves the circuit board 71 from the main body portion 62 to the protrusion direction (+X side) of the connector portion 63.

In this case, the circuit board 71 moves, and at the same time the circuit board 71 rotates using the first circuit board support portions 67a and 67b as a leverage point. In more detail, the circuit board 71 rotates in a direction along which the slope of the circuit board 71 approaches a slope perpendicular or substantially perpendicular to the axial direction (Z-axis direction).

Figure 9:
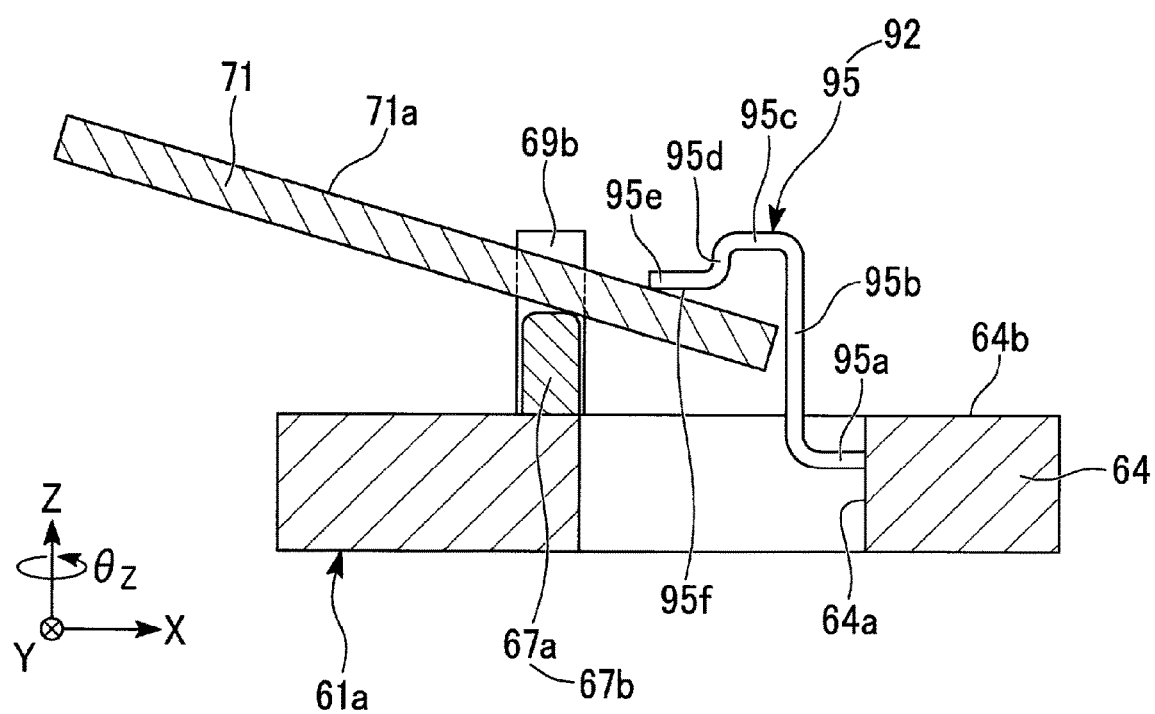
FIG. 9 is a cross-sectional view illustrating some of the procedures of an arrangement process of the circuit board according to a first preferred embodiment of the present invention.

As described above, under the condition that the circuit board 71 is removed, the contact surface 95f is disposed at the front side (−Z side) ahead of the circuit board rear surface 71a of the circuit board 71 after completion of the arrangement, in the axial direction (Z-axis direction). Therefore, as illustrated in FIG. 9, in the moving process S12, according to rotation of the circuit board 71, the contact portion 95e is pressed from the circuit board rear surface 71a to the rear side (+Z side). With this, for example, the first extension portion 95b and the second extension portion 95d are elastically deformed in the axial direction (Z-axis direction). As a result, the circuit board 71 is pressed from the rear side to the front side by the circuit board connection terminal 95.

As illustrated in FIGS. 9 and 13, the position-determining process S13 is a process of determining the position of the circuit board 71 by inserting the first protrusion portions 69a and 69b into the first notch portions 74a and 74b. In this process, the inner edge of the bottom side of the first notch portions 74a and 74b are pressed by the first protrusion portions 69a and 69b. With this, the position of the circuit board 71 is determined in the protrusion direction (X-axis direction) of the connector portion 63.

Figure 10:
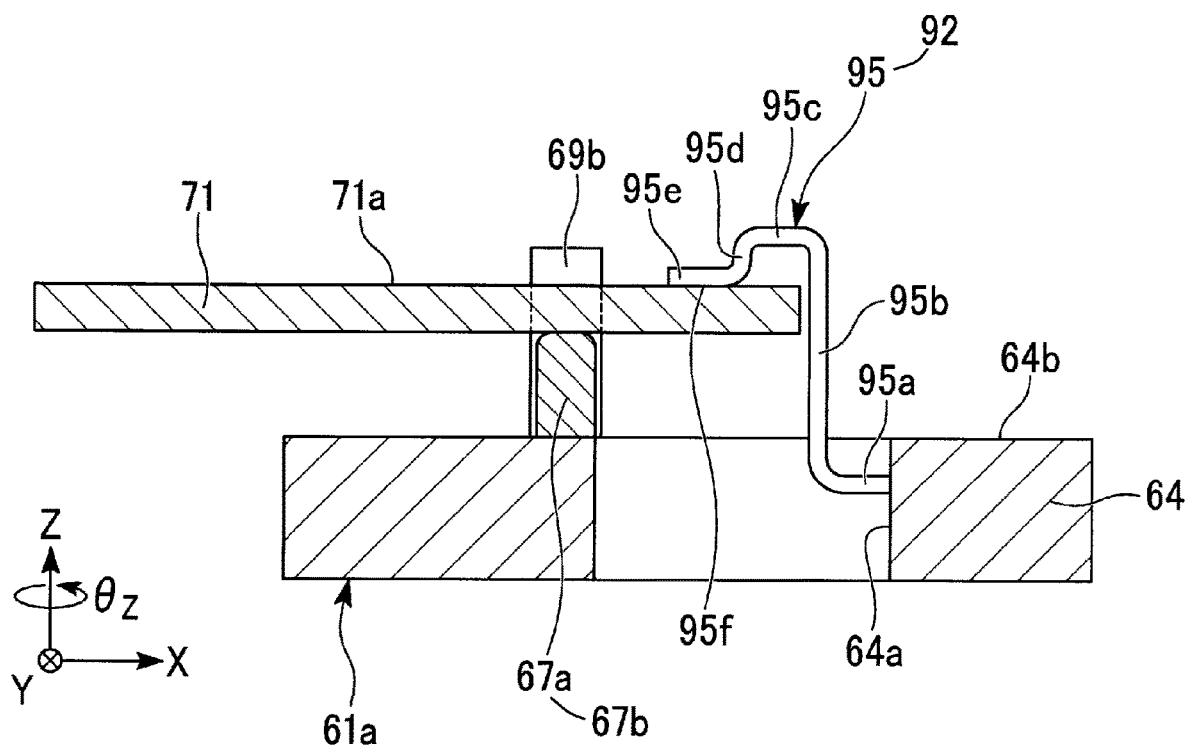
FIG. 10 is a cross-sectional view illustrating some of the procedures of an arrangement process of the circuit board according to a first preferred embodiment of the present invention.

As illustrated in FIG. 10, the circuit board 71 is located perpendicular or substantially perpendicular to the axial direction (Z-axis direction). With this, the circuit board 71 is supported, from the front side (−Z side), by the first circuit board support portions 67a and 67b. That is, the position of the circuit board 71 is determined in the axial direction. Further, when the circuit board 71 is vertically tilted with respect to the axial direction, the second protrusion portions 69c and 69d are respectively inserted into the second notch portions 74c and 74d as illustrated in FIG. 13. Further, the bus bar holder convex portions 69e and 69f are inserted into the circuit board hole portions 77a and 77b (not illustrated).

Figure 11:
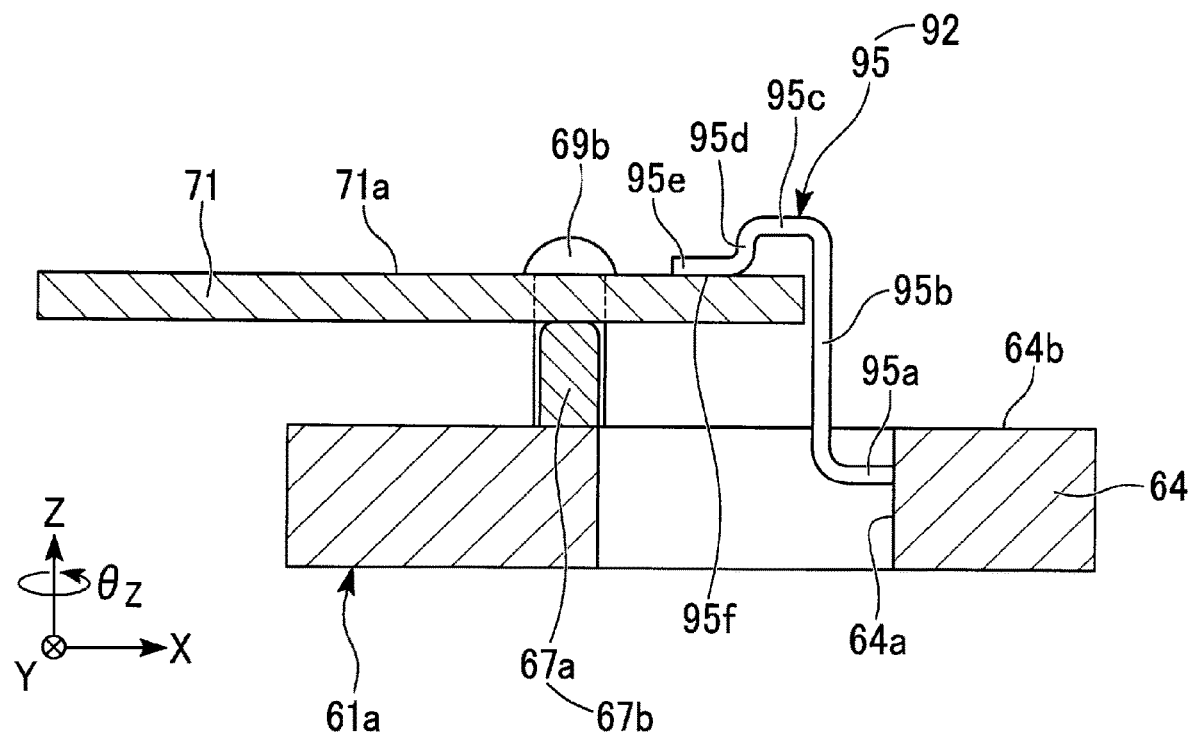
FIG. 11 is a cross-sectional view illustrating some of the procedures of an arrangement process of the circuit board according to a first preferred embodiment of the present invention.

As illustrated in FIG. 11, the fixing process S14 is a process of depositing the first protrusion portion 69b to the circuit board 71. As illustrated in FIG. 10, the end of the first protrusion portion 69b is dissolved by heat. As illustrated in FIG. 11, the end of the rear side of the first protrusion portion 69b is deposited on the circuit board rear surface 71a. For example, the end of the rear side of the first protrusion portion 69b preferably has a hemispheric or substantially hemispheric shape. In association with the first protrusion portion 69a, the first protrusion portion 69b is also deposited on the circuit board 71 by the same process.

Further, the method of depositing the first protrusion portions 69a and 69b to the circuit board 71 is not particularly limited thereto. For example, the above-mentioned deposition method may be heat-plate deposition, spin deposition, or ultrasound deposition. By this process, the circuit board 71 is fixed to the first protrusion portions 69a and 69b.

Further, in the fixing process S14, like the first protrusion portions 69a and 69b, the second protrusion portions 69c and 69d are deposited on the circuit board rear surface 71a.

By the range from the inserting process S11 to the fixing process S14, the arrangement process of the circuit board 71 end. As a result, the circuit board 71 is disposed at the bus bar holder 61.

In the method of manufacturing the motor 10 according to this preferred embodiment, the process other than the arrangement process of the circuit board 71 is not limited thereto. Other manufacturing methods other than the above-mentioned process may also be used in the method of manufacturing the motor 10.

In accordance with this preferred embodiment, the circuit board connection terminal 95 is connected to the circuit board rear surface 71a. With this, the circuit board 71 is able to be strongly fixed to the circuit board connection terminal 95.

In accordance with this preferred embodiment, in order to connect the circuit board connection terminal 95 to the circuit board rear surface 71a, the circuit board 71 is inserted into the front side of the circuit board connection terminal 95. Thereafter, the circuit board 71 moves along the opening direction of the first notch portions 74a and 74b. With this, the first notch portions 74a and 74b and the first protrusion portions 69a and 69b are fitted so that the position of the circuit board 71 is able to be determined. As a result, the position of the circuit board 71 is able to be accurately determined with respect to the bus bar holder 61. As a result, the circuit board 71 is able to be disposed at the bus bar holder 61 with high position accuracy.

Therefore, the circuit board 71 is able to be strongly connected to the circuit board connection terminal 95, and the circuit board 71 is able to be disposed at high position accuracy.

In the present preferred embodiment, the first notch portions 74a and 74b are fitted into the first protrusion portions 69a and 69b. The second notch portions 74c and 74d are fitted into the second protrusion portions 69c and 69d. The first protrusion portions 69a and 69b are disposed at the first region AR1. The second protrusion portions 69c and 69d are disposed at the second region AR2. That is, in both regions separated from each other on the basis of the center axis J, the first circuit board 71 is fitted into the first protrusion portions 69a and 69b and the second protrusion portions 69c and 69d. With this arrangement, the position accuracy of the circuit board 71 is able to be further improved. Further, each protrusion portion is fixed to the circuit board 71, thereby the circuit board 71 is able to be stably fixed to the bus bar holder 61.

In accordance with the present preferred embodiment, the second notch portion 74c, 74d is opened toward the direction opposite to the first notch portions 74a and 74b. Therefore, as illustrated in FIG. 13, when the circuit board 71 is tilted perpendicular or substantially perpendicular to the axial direction, the second notch portions 74c and 74d are able to be easily fitted into the second protrusion portions 69c and 69d.

In accordance with the present preferred embodiment, the second protrusion portion includes the second protrusion portion 69c and the second protrusion portions 69d. That is, the protrusion portion includes a plurality of second protrusion portions. The second notch portion includes the second notch portion 74c and the second notch portions 74d. That is, a plurality of second notch portions may be provided at the outer edge of the circuit board 71. Therefore, the circuit board 71 is able to be more stably fixed to the bus bar holder 61.

In accordance with the present preferred embodiment, the first protrusion portion preferably includes the first protrusion portion 69a and the first protrusion portions 69b. That is, the protrusion portion includes a plurality of the first protrusion portions. The first notch portion includes the first notch portion 74a and the first notch portions 74b. That is, the plurality of the first notch portions are disposed at the outer edge of the circuit board 71. Therefore, in the position-determining process S13, the position of the circuit board 71 is able to be more accurately decided. Further, the circuit board 71 is able to be more stably fixed to the bus bar holder 61.

In accordance with the present preferred embodiment, the circuit board convex portions 76a and 76b protruding from the circuit board main body 75 toward the arrangement direction of the circuit board connection terminal 95 are preferably disposed at the circuit board 71. The first notch portions 74a and 74b are disposed at the circuit board convex portions 76a and 76b. Therefore, when the circuit board 71 moves after the circuit board main body 75 is inserted into the front side of the circuit board connection terminal 95, the first notch portions 74a and 74b are able to be easily fitted into the first protrusion portions 69a and 69b. That is, in the position-determining process S13, the position of the circuit board 71 is able to be easily determined.

In accordance with the present preferred embodiment, the first notch portions 74a and 74b are preferably disposed at the circuit board convex portions 76a and 76b. The first protrusion portions 69a and 69b are preferably disposed at the radially outer side ahead of the end of the radially inner side of the coil connection portions 91a-91f. With this, the main surface of the circuit board main body 75 is increased in area.

In accordance with the present preferred embodiment, the first protrusion portions 69a and 69b and the second protrusion portions 69c and 69d are deposited on the circuit board rear surface 71a. Therefore, the circuit board 71 is able to be more strongly fixed to the bus bar holder 61.

In the present preferred embodiment, the bus bar holder 61 preferably includes bus bar holder convex portions 69e and 69f. The bus bar holder convex portions 69e and 69f are inserted into the circuit board hole portions 77a and 77b. Therefore, the circuit board 71 is disposed with higher position accuracy.

In accordance with the present preferred embodiment, the first circuit board support portions 67a and 67b are disposed in the first region AR1. Therefore, the circuit board 71 is able to be disposed at the position located close to the contact portion 95e corresponding to a connection portion between the circuit board 71 and the circuit board connection terminal 95. With this, when impact is applied to the motor 10, the degree of displacement of the circuit board 71 is reduced, in the connection portion between the circuit board 71 and the contact portion 95e. As a result, the connection portion between the circuit board 71 and the contact portion 95e, for example, the soldered portion, is prevented from being damaged. Further, unstable connection between the circuit board 71 and the circuit board connection terminal 95 is prevented from occurring.

In accordance with the present preferred embodiment, when viewed from the axial direction, the first circuit board support portions 67a and 67b are disposed at a position different from that of the contact portion 95e. Therefore, when the contact portion 95e is connected to the circuit board 71, for example, heat caused by soldering is not easily applied to the first circuit board support portions 67a and 67b. As a result, the above-mentioned operation is able to prevent the first circuit board support portions 67a and 67b from being deformed by heat. Further, the circuit board 71 is able to be stably supported by the first circuit board support portions 67a and 67b.

In accordance with the present preferred embodiment, the second circuit board support portion 67c is disposed in a second region AR2. With this, by the first circuit board support portions 67a and 67b and the second circuit board support portion 67c, the circuit board 71 are able to be supported in the first region AR1 and the second region AR2 on the basis of the center axis J. As a result, the circuit board 71 is more stably supported.

Further, the scope of the present invention is not limited only to the above-mentioned structure, and the following structure and methods can also be applied to the present invention. In the following description, the same components as those of the above-mentioned preferred embodiment are denoted with the same reference numbers and therefore the description of thereof may be omitted.

Figure 14:
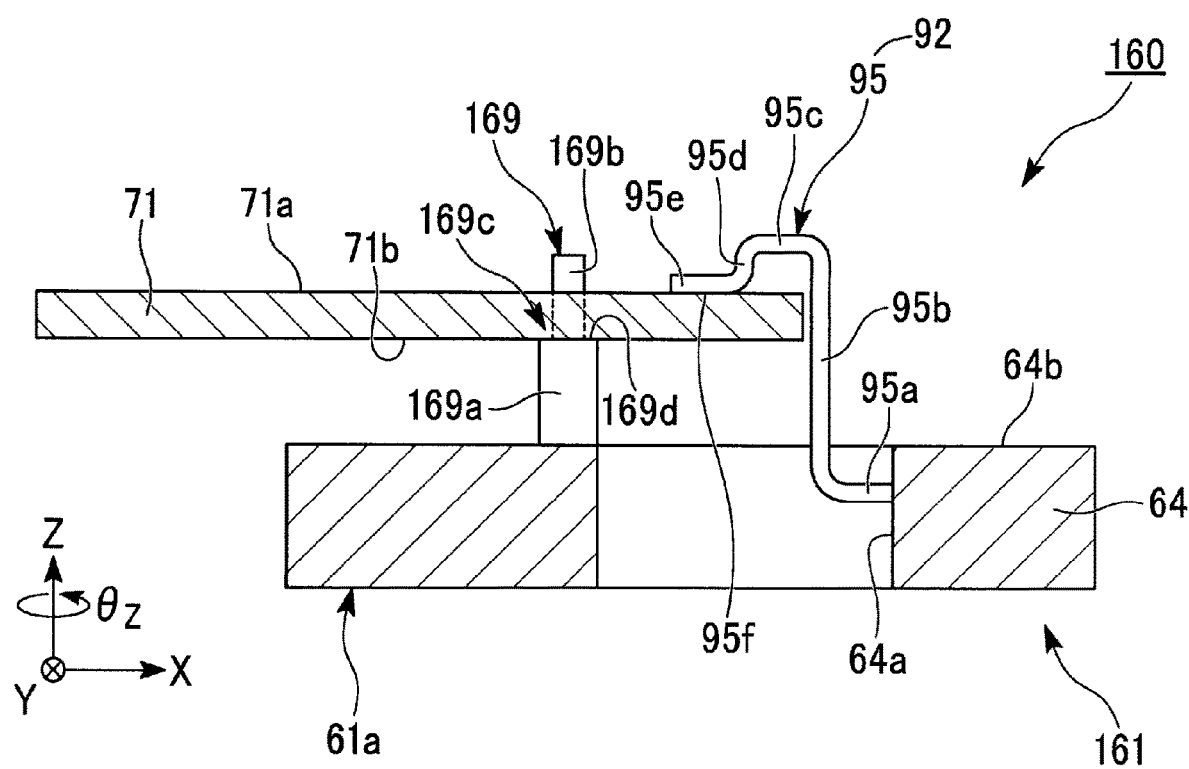
FIG. 14 is a cross-sectional view illustrating another example of the bus bar assembly according to a first preferred embodiment of the present invention.

The structure of FIG. 14 may also be applied to preferred embodiments of the present invention. FIG. 14 is a cross-sectional view illustrating some of the bus bar assembly 160 according to another example of a preferred embodiment of the present invention. As illustrated in FIG. 14, the bus bar assembly 160 includes a bus bar holder 161. The bus bar holder 161 includes a first protrusion portion 169. The first protrusion portion 169 is located at the same position as the first protrusion portion 69b. The first protrusion portion 169 preferably includes a large-diameter portion 169a protruding from the bottom portion 61a and a small-diameter portion 169b connected to the rear side (+Z side) of the large-diameter portion 169a. The small-diameter portion 169b is larger in diameter than the large-diameter portion 169a. That is, the first protrusion portion 169 includes a stepped portion 169c that decreases in thickness toward the rear side.

The first notch portion 74b is fitted into the small-diameter portion 169b of the first protrusion portion 169 (not illustrated). From among the small-diameter portion 169b, a specific portion protruding toward the rear side (+Z side) of the circuit board 71 is deposited on the circuit board rear surface 71a. FIG. 14 illustrates a state before the first protrusion portion 169 is deposited. The circuit board front surface 71b contacts the stepped surface 169d crossing the axial direction (Z-axis direction) at the stepped portion 169c.

With the above structure, the stepped surface 169d and the circuit board front surface 71b are in contact with each other. Therefore, the circuit board 71 is supported from the rear side by the first protrusion portion 169. With this, the circuit board 71 is more stably fixed.

According to the above structure, the position of the circuit board 71 is able to be determined in the axial direction using the first protrusion portion 169. Therefore, the first circuit board support portion 67a or the like is not always disposed. With this, the bus bar holder 161 is able to be simplified in structure, and the bus bar holder 161 is able to be easily fabricated.

In the above-mentioned structure, any one of the first protrusion portions 69a and 69b and the second protrusion portions 69c and 69d illustrated in FIG. 5 may be identical in structure to the first protrusion portion 169. A plurality of protrusion portions may be identical in structure to the first protrusion portion 169. The first protrusion portions 69a and 69b and the second protrusion portions 69c and 69d illustrated in FIG. 5 may also be identical in structure to the first protrusion portion 169. That is, according to this structure, at least one protrusion portion may have a stepped portion that decreases in thickness toward the rear side.

Figure 15:
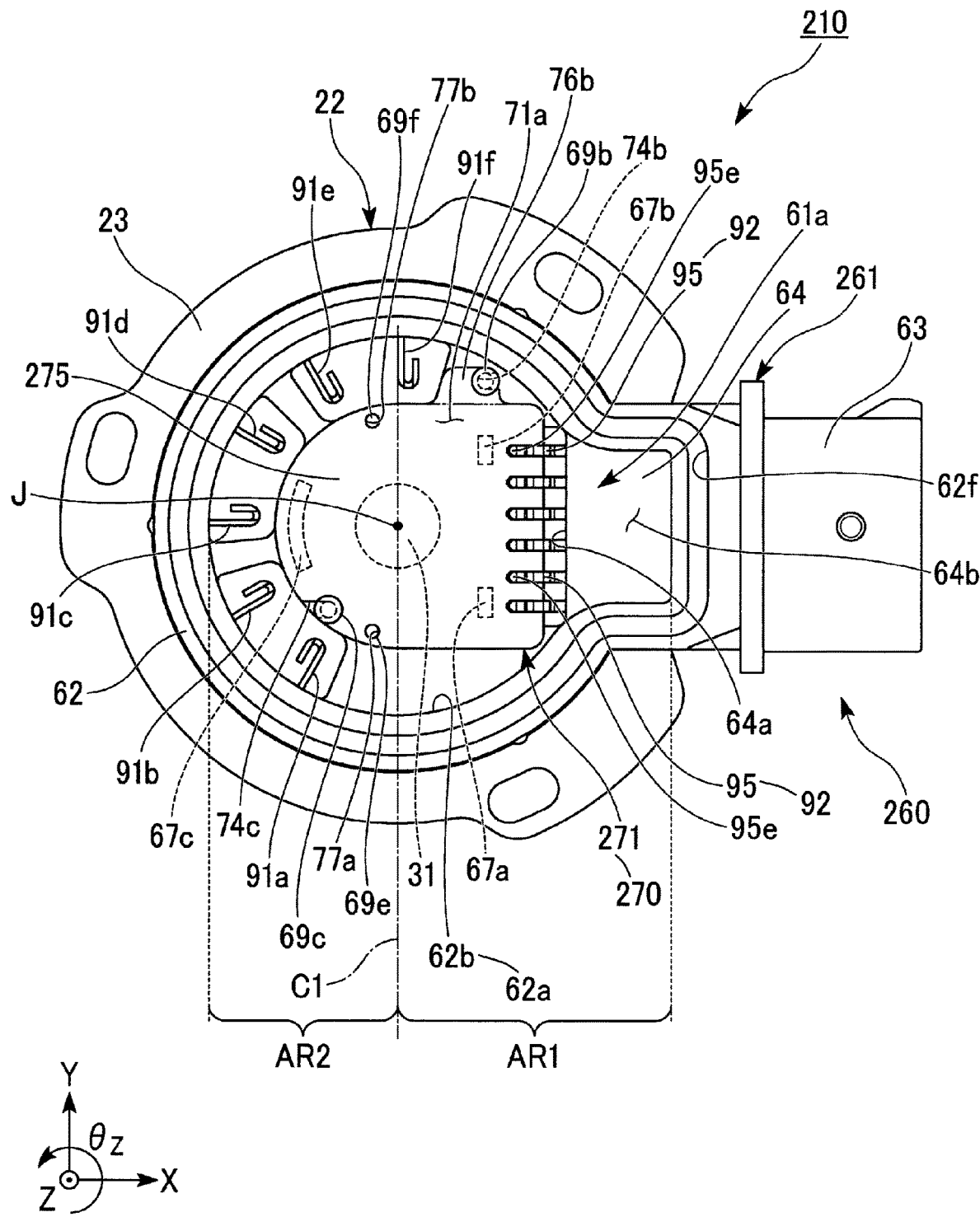
FIG. 15 is a plan view illustrating another example of the motor according to a first preferred embodiment of the present invention.

As illustrated in FIG. 15, the number of the first notch portions and the number of the second notch portions are set to 1, are not limited thereto. That is, the number of the first notch portions may be set to 1 or at least 3. The number of the second notch portions may be 1 or at least 3. Also, the second notch portion may be not always disposed.

FIG. 15 is a plan view illustrating the motor 210 of another example of a preferred embodiment of the present invention. As illustrated in FIG. 15, the motor 210 preferably includes a bus bar assembly 260 and a controller 270. The bus bar assembly 260 includes a bus bar holder 261. The controller 270 includes a circuit board 271.

The bus bar holder 261 is preferably identical in structure to the bus bar holder 61 illustrated in FIG. 3 and the like, excepting that the first protrusion portion 69a and the second protrusion portion 69d are not disposed. That is, the bus bar holder 261 includes a single first protrusion portion 69b and a single second protrusion portion 69c.

The circuit board 271 preferably includes a circuit board main body 275a and a single circuit board convex portion 76b. That is, since the circuit board 271 does not have the circuit board convex portion 76a, the circuit board 271 is different in structure from the circuit board 71 of FIG. 3 and the like. That is, since the circuit board 271 does not have the first notch portion 74a, the circuit board 271 has a different structure from the above-mentioned circuit board 71.

Although the circuit board main body 275 does not have the second notch portion 74d, the remaining elements other than the second notch portion 74d are preferably identical to those of the circuit board main body 75 of FIG. 3 and the like. Other elements of the circuit board 271 are preferably identical in structure to those of the circuit board 71 of FIG. 3 and the like. Other elements of the motor 210 are preferably identical to those of the motor 10 illustrated in FIG. 1 and the like.

By the above-mentioned structure, the number of protrusion portions disposed in the bus bar holder 261 is reduced. Therefore, the bus bar holder 261 is simplified in structure.

With the above-mentioned structure, when viewed from the axial direction, the center axis J is disposed between the first protrusion portion 69b and the second protrusion portion 69c. With this, the circuit board 271 is stably fixed.

As illustrated in FIG. 15, only one circuit board convex portion may be provided, or the circuit board convex portion may be completely omitted. In FIG. 15, although only one circuit board convex portion and only one first notch portion are disposed, the present invention is not limited thereto. For example, only one circuit board convex portion may be provided or two first notch portions may be provided. In this case, at least one first notch portion is disposed at the circuit board main body portion 75.

The opening direction of the first notch portions 74a and 74b may be any one of the arrangement directions (Y-axis direction) of the circuit board connection terminal 95. That is, the first notch portions 74a and 74b may also be opened toward any one of a direction from the center axis J to the circuit board connection terminal 95 and the arrangement direction of the circuit board connection terminal 95, when viewed from the axial direction.

The "Direction from the center axis J to the circuit board connection terminal 95 when viewed from the axial direction" is not limited to the protrusion direction (+X direction) from the connector portion 63 to the main body portion 62, and the "Direction from the center axis J to the circuit board connection terminal 95 when viewed from the axial direction" may also include all directions, each of which ranges from the center axis J to the circuit board connection terminal 95 when viewed from the axial direction.

Figure 16:
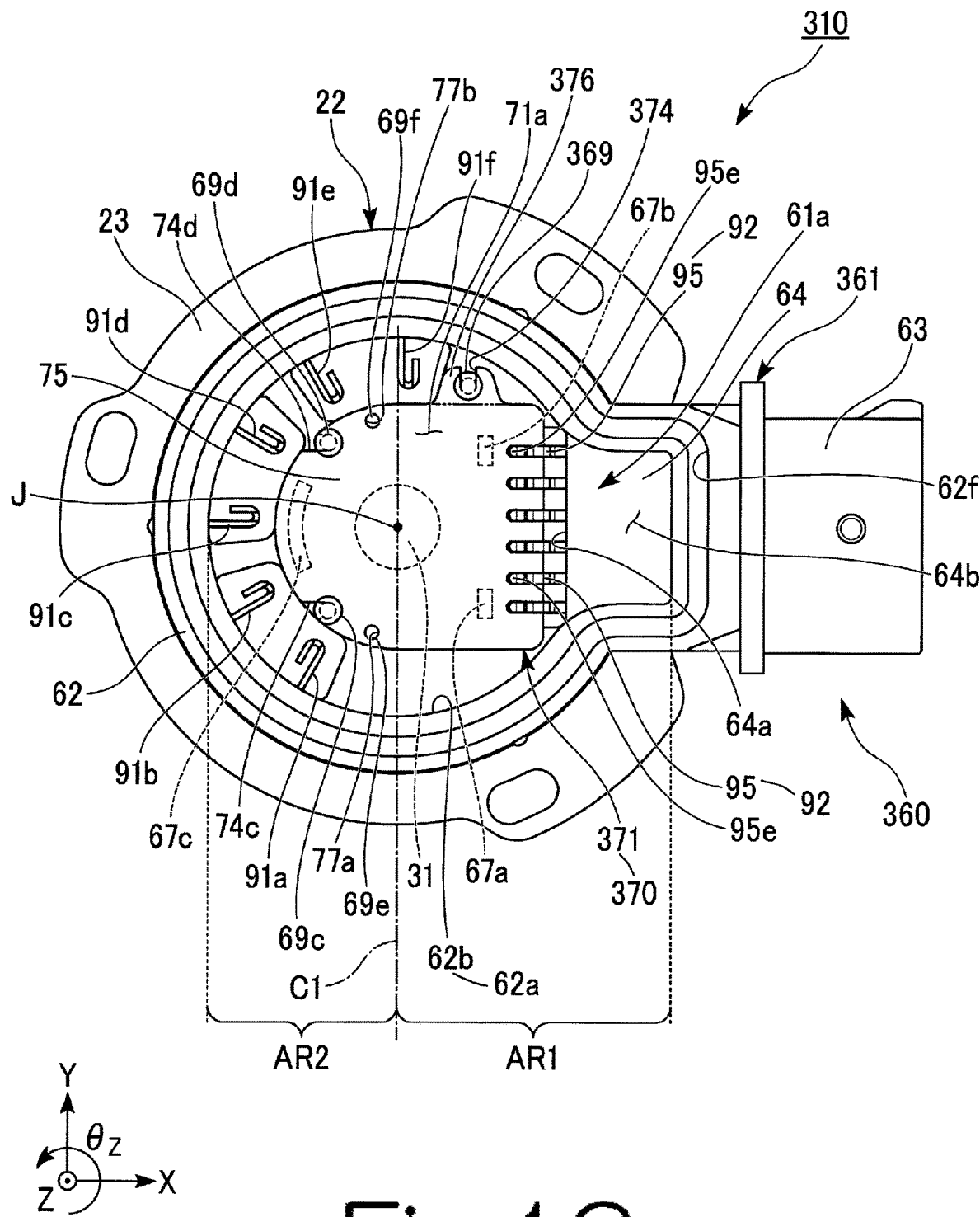
FIG. 16 is a plan view illustrating another example of the motor according to a first preferred embodiment of the present invention.

The opening direction of the first notch portion 74b may also be different from the above-mentioned structure. In FIG. 16, the opening direction of the first notch portion 74b is set to one of the arrangement directions of the circuit board connection terminal 95.

FIG. 16 is a plan view illustrating the motor 310 according to another example of a preferred embodiment of the present invention. As illustrated in FIG. 16, the motor 310 preferably includes a bus bar assembly 360 and a controller 370. The bus bar assembly 360 includes a bus bar holder 361. The controller 370 includes a circuit board 371.

The bus bar holder 361 includes first circuit board support portions 67a and 67b, the second circuit board support portion 67c, a plurality of protrusion portions extending from the bottom portion 61a to the rear side, and bus bar holder convex portions 69e and 69f. A plurality of protrusion portions includes a single first protrusion portion 369 and second protrusion portions 69c and 69d. The first protrusion portion 369 is identical in structure to the first protrusion portion 69b illustrated in FIG. 3 and the like. Other elements of the bus bar holder 361 are identical in structure to those of the bus bar holder 61 of FIG. 3 and the like.

The circuit board 371 preferably includes a circuit board main body 75 and a single circuit board convex portion 376. Differently from the circuit board 71 illustrated in FIG. 3 and the like, the circuit board 371 does not have the first notch portion 74a.

The first notch portion 374 is preferably disposed at the circuit board convex portion 376. The first notch portion 374 extends in the arrangement direction (Y-axis direction) of the circuit board connection terminal 95. The first notch portion 374 is opened toward one direction (+Y direction) from among the arrangement directions (Y-axis directions) of the circuit board connection terminal 95. In the above-mentioned structure, the opening direction of the first notch portion 374 is perpendicular or substantially perpendicular to the opening direction of the second notch portions 74c and 74d.

Other elements of the circuit board convex portion 376 are identical in structure to the circuit board convex portion 76b illustrated in FIG. 3 and the like. Other elements of the circuit board 371 are identical in structure to the circuit board 71 illustrated in FIG. 3 and the like. Other elements of the motor 310 are identical to those of the motor 10 illustrated in FIG. 1 and the like.

With the above-mentioned structure, in the moving process S12, the circuit board 371 is able to move to the +Y direction (i.e., the arrangement direction (Y-axis direction) of the circuit board connection terminal 95).

The opening direction of the second notch portions 74c and 74d may not be opposite to the opening direction of the first notch portions 74a and 74b. In FIG. 16, although the opening direction of the second notch portions 74c and 74d is perpendicular or substantially perpendicular to the opening direction of the first notch portion 374, the present invention is not limited thereto. For example, the opening direction of the second notch portions 74c and 74d may be identical to the opening direction of the first notch portions 74a and 74b, and may cross the opening direction of the first notch portions 74a and 74b.

Any one of the first protrusion portions 69a and 69b and the second protrusion portions 69c and 69d or at least two of the first protrusion portions 69a and 69b and the second protrusion portions 69c and 69d may not be deposited on the circuit board 71. In the present preferred embodiment, at least one protrusion portion may be deposited on the circuit board rear surface 71a of the circuit board 71.

Any one or at least two of the first protrusion portions 69a and 69b and the second protrusion portions 69c and 69d may be fixed to the circuit board 71 by other methods other than the deposition method. For example, the first protrusion portions 69a and 69b and the second protrusion portions 69c and 69d may be fixed to the circuit board 71 by an adhesive.

Only one or at least three from among the bus bar holder convex portions 69e and 69f and the circuit board hole portions 77a and 77b may be used.

In the above description, although the circuit board 71 is disposed at the rear side of the shaft 31, the present invention is not limited thereto. The shaft 31 may be inserted into the through-hole disposed at the circuit board 71, and the end of the rear side of the shaft 31 may protrude from the rear side of the circuit board 71.

A second preferred embodiment of the present invention is different from the first preferred embodiment in that an elongated hole portion is disposed at the circuit board of the second preferred embodiment. In the following description, the same components as those of the above-mentioned preferred embodiment are preferably denoted with the same reference numbers and therefore the description of thereof may be omitted.

Figure 17:
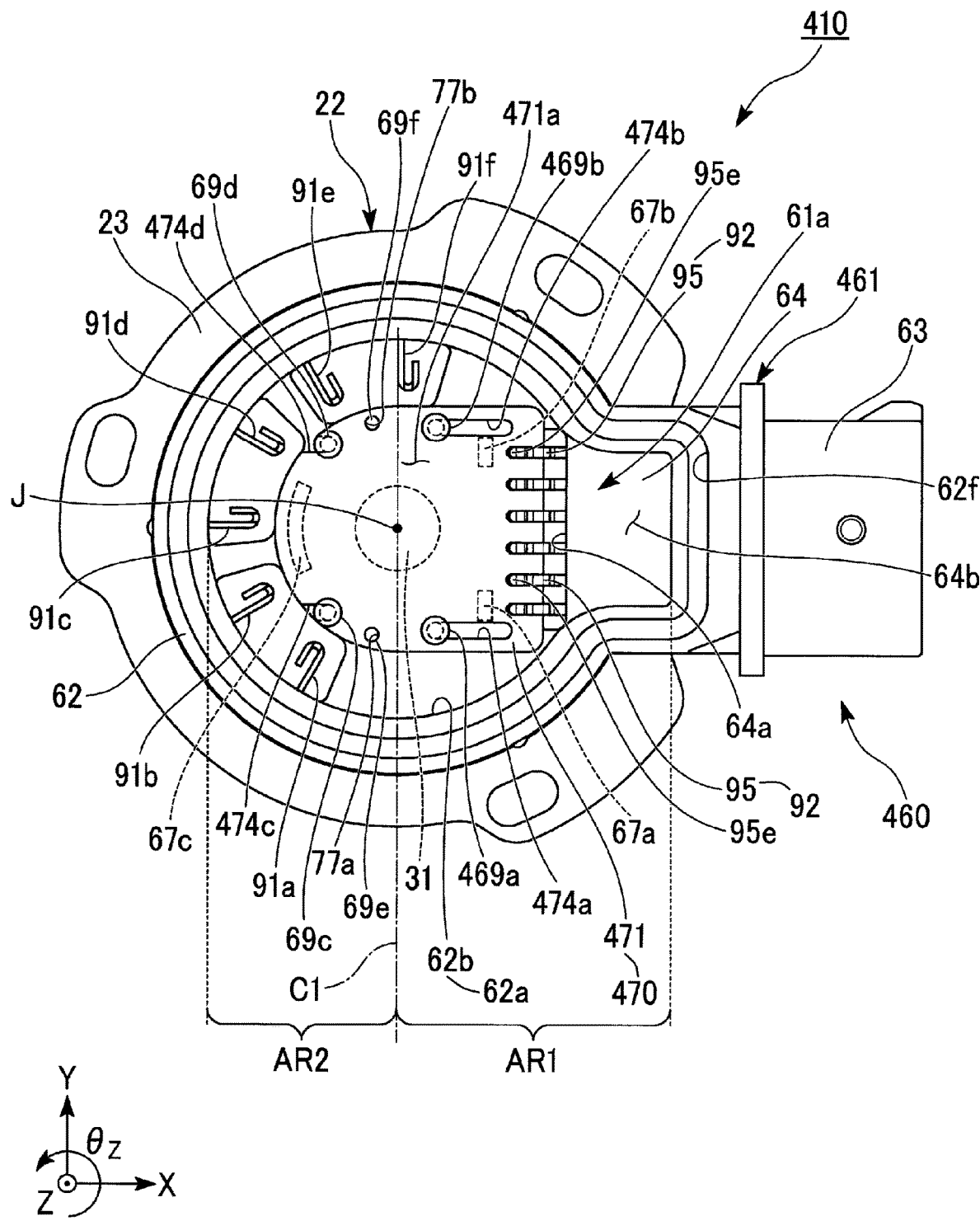
FIG. 17 is a plan view illustrating the motor according to a second preferred embodiment of the present invention.

FIG. 17 is a plan view (XY plane view) illustrating the motor 410 according to this preferred embodiment. The cover 22 is omitted from FIG. 17. As illustrated in FIG. 17, the motor 410 preferably includes a bus bar assembly 460 and a controller 470. The bus bar assembly 460 includes a bus bar holder 461. The bus bar holder 461 includes the first circuit board support portions 67a and 67b, the second circuit board support portion 67c, the first protrusion portions 469a and 469b, the second protrusion portions 69c and 69d, and the bus bar holder convex portions 69e and 69f. The controller 470 includes a circuit board 471.

The first protrusion portion 469a and the first protrusion portion 469b are disposed at the first region AR1. The first protrusion portion 469a and the first protrusion portion 469b are deposited on the circuit board rear surface 471a. The first protrusion portion 469a is disposed at the bottom portion 61a. The first protrusion portion 469a is preferably identical in structure to the first protrusion portion 69a of the first preferred embodiment, excepting that the position of the bottom portion 61a of the first protrusion portion 469a of the second preferred embodiment is different from that of the first preferred embodiment. The first protrusion portion 469b is preferably identical in structure to the first protrusion portion 69b of the first preferred embodiment, excepting that the position of the bottom portion 61a of the first protrusion portion 469b of the second preferred embodiment is different from that of the first preferred embodiment.

The plane-view (XY plane view) shape of the circuit board 471 is preferably identical to the plane-view shape of the circuit board main body 75 at the circuit board 71 of the first preferred embodiment. That is, the circuit board convex portion is not disposed at the circuit board 471.

Two elongated hole portions 474a and 474b are disposed at the circuit board 471. When viewed from the axial direction (Z-axis direction), the elongated hole portions 474a and 474b preferably extend in the direction from the center axis J to the circuit board connection terminal 95. In the present preferred embodiment, the elongated hole portions 474a, 474b extend in the protrusion direction (X-axis direction) of the connector portion 63. The elongated hole portion 474a is parallel or substantially parallel to the elongated hole portion 474b.

The elongated hole portion 474a is disposed at one side (−Y side) of the plurality of circuit board connection terminal in the division-line direction (Y-axis direction). The elongated hole portion 474b is disposed at the other side (+Y side) of the plurality of circuit board connection terminals 95 in the division-line direction. That is, the circuit board connection terminals 95 are disposed between the elongated hole portion 474a and the elongated hole portion 474b in the division-line direction.

The first protrusion portion 469a is inserted into the elongated hole portion 474a. The first protrusion portion 469a contacts the inner edge of the elongated hole portion 474a at the end corresponding to the opposite side (−X side) of the connector portion 63.

The first protrusion portion 469b is inserted into the elongated hole portion 474b. The first protrusion portion 469b contacts the inner edge of the elongated hole portion 474b at one end of the elongated hole portion 474b, i.e., the end corresponding to the opposite side (−X side) of the connector portion 63.

In the present preferred embodiment, each of one end of the elongated hole portion 474a and one end of the elongated hole portion 474b is one end of the side located near the center axis J.

The notch portions 474c and 474d are preferably disposed at the outer edge of the circuit board 471. The notch portion 474c is identical in structure to the second notch portion 74c of the first preferred embodiment. The notch portion 474d is identical in structure to the second notch portion 74d.

The notch portions 474c and 474d are opened in the direction from the other end of the elongated hole portions 474a and 474b to one end (i.e., the end of the side (−X side) located near the center axis J). That is, the notch portions 474c and 474d are opened in the direction from the end of the side (+X side) located far from the center axis J of the elongated hole portions 474a and 474b to the end of the side (−X side) located near the center axis J. The second protrusion portions 69c and 69d are inserted into the notch portions 474c and 474d. Other elements of the motor 410 are preferably identical to those of the motor 10 of the first preferred embodiment.

Figure 18:
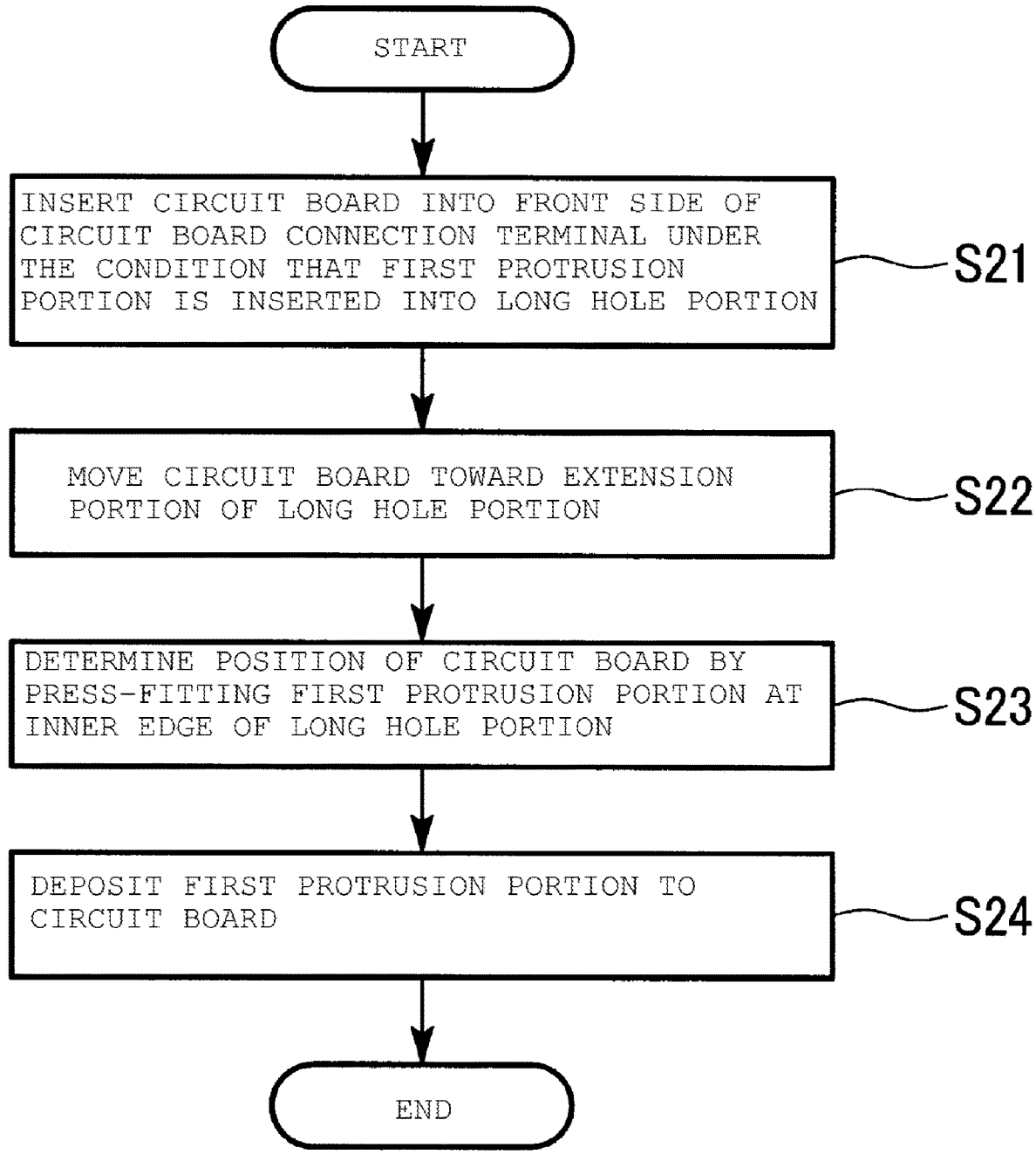
FIG. 18 is a flowchart illustrating a procedure of an arrangement process of the circuit board according to a second preferred embodiment of the present invention.
Figure 19:
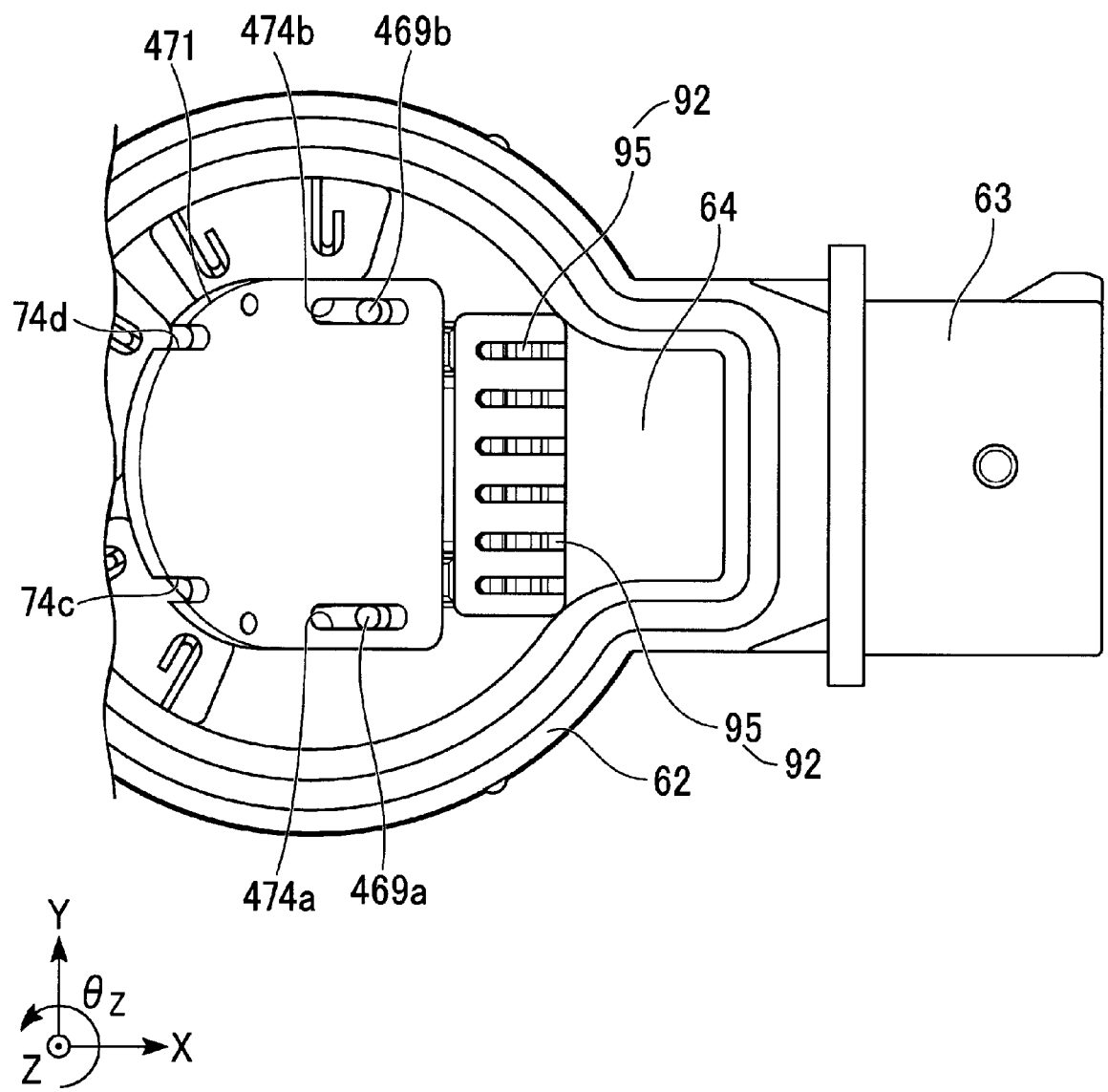
FIG. 19 is a plan view illustrating some of the procedures of an arrangement process of the circuit board according to a second preferred embodiment of the present invention.
Figure 20:
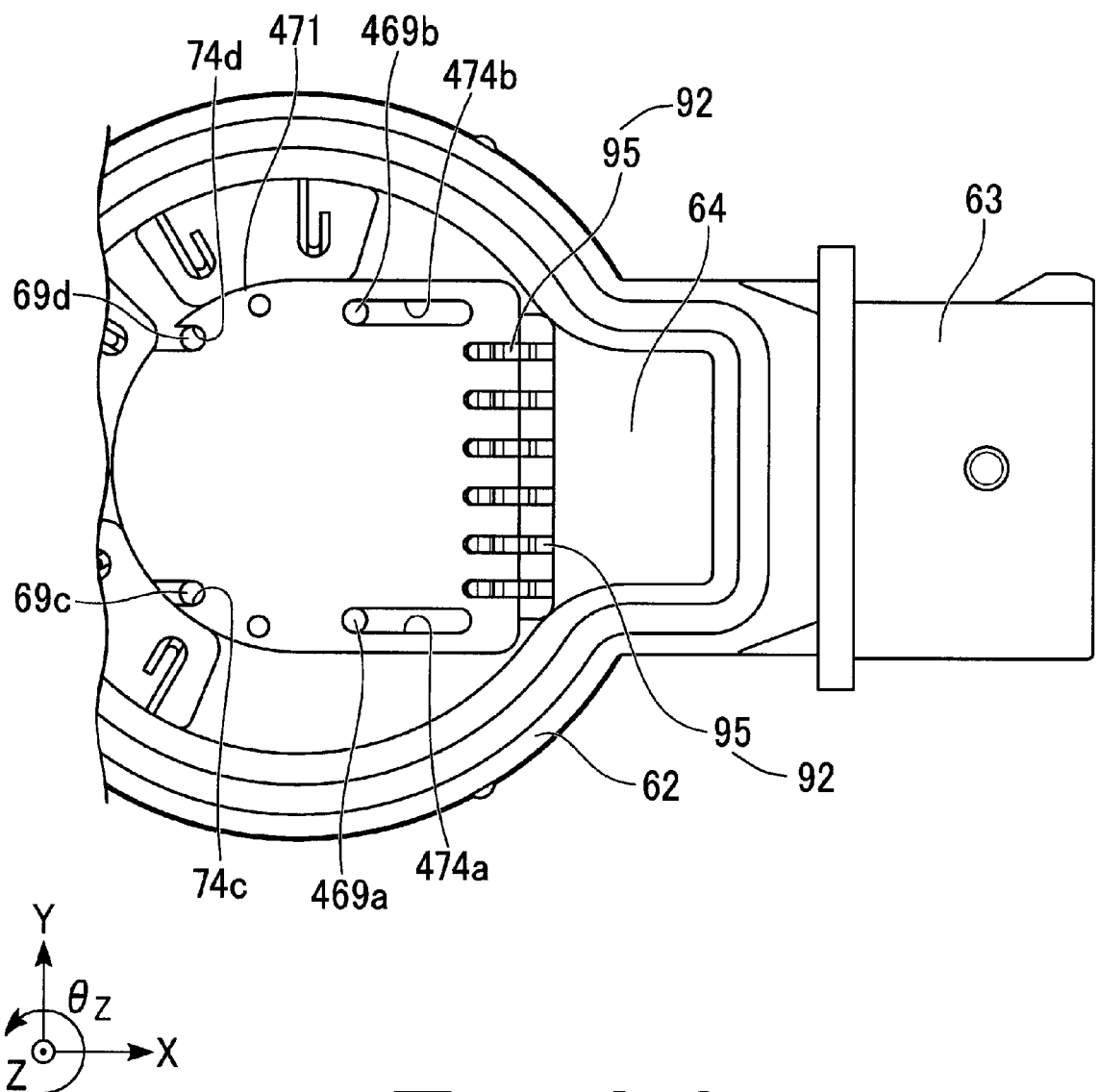
FIG. 20 is a plan view illustrating some of the procedures of an arrangement process of the circuit board according to a second preferred embodiment of the present invention.

Hereinafter, a method of manufacturing the motor 410 according to the second preferred embodiment will be described. The second preferred embodiment will disclose only the arrangement process of the circuit board 471 from among plural steps of the fabrication method of the motor 410 in detail. FIG. 18 is a flowchart illustrating the arrangement process of the circuit board 471 of the motor 410. FIGS. 19 and 20 are plan views illustrating some of the arrangement process of the circuit board 471.

As illustrated in FIG. 18, the arrangement process of the circuit board 471 according to this preferred embodiment preferably includes an inserting process S21, a moving process S22, a position-determining process S23, and a fixing process S24. First of all, the inserting process S21 is a process respectively inserting the first protrusion portions 469a and 469b into the elongated hole portions 474a and 474b, and at the same time inserting the circuit board 471 into the front side (−Z side) of the circuit board connection terminal 95.

As illustrated in FIG. 19, the first protrusion portion 469a is inserted into the elongated hole portion 474a, and at the same time the first protrusion portion 469b is inserted into the elongated hole portion 474b. The circuit board 471 moves to the circuit board connection terminal 95 (+X side). The circuit board 471 is disposed at the connector portion 63 (+X side). The end of the circuit board 471 is inserted into the front side (−Z side) of the circuit board connection terminal 95.

In this process, the circuit board 471 is tilted with respect to the axial direction (Z-axis direction) preferably in the same manner as in the circuit board 71 of the first preferred embodiment illustrated in FIG. 8.

The moving process S22 is a process of moving the circuit board 471 along the extension direction (X-axis direction) of the elongated hole portions 474a and 474b. In the present preferred embodiment, the circuit board 471 moves along the direction (+X direction) through which the connector portion 63 protrudes from the main body portion 62. Other aspects of the moving process S22 are preferably identical to those of the moving process S12 of the first preferred embodiment.

As illustrated in FIG. 20, the position-determining process S23 is a process of pressing the first protrusion portions 469a and 469b using the inner edge of the elongated hole portions 474a and 474b, and thus determining the position of the circuit board 471. In more detail, the position-determining process S23 presses the first protrusion portion 469a using the inner edge of the elongated hole portion 474a at the end corresponding to the opposite side (−X side) of the connector portion 63. The position-determining process S23 presses the first protrusion portion 469b using the inner edge at the end corresponding to the opposite (−X side) of the connector portion 63 of the elongated hole portion 474b. Thereafter, the circuit board 471 is arranged perpendicular or substantially perpendicular to the axial direction (Z-axis direction). In FIG. 20, the circuit board 471 is arranged perpendicular or substantially perpendicular to the axial direction.

The fixing process S24 is preferably identical to the fixing process S14 of the first preferred embodiment. With the range from the inserting process S21 to the fixing process S24, the arrangement process of the circuit board 471 is completed and the circuit board 471 is then disposed at the bus bar holder 461.

In the method of manufacturing the motor 410 of this preferred embodiment, the remaining processes other than the arrangement process of the circuit board 471 are not limited thereto, and any process may also be applied to this preferred embodiment.

In the present preferred embodiment, the circuit board 471 is able to be strongly fixed to the circuit board connection terminal 95 in the same manner as in the first preferred embodiment. Further, the elongated hole portions 474a and 474b in which the first protrusion portions 469a and 469b are respectively inserted are disposed. Therefore, under the condition that the first protrusion portions 469a and 469b are inserted into the elongated hole portions 474a and 474b when the circuit board 471 is disposed, the elongated hole portions 474a and 474b which are capable of moving the circuit board 471 are able to be used as a guide. As a result, the position of the circuit board 471 is able to be accurately determined, and the circuit board 471 is able to be disposed at the bus bar holder 461 with high position accuracy.

With the above-mentioned structure, according to the present preferred embodiment, the circuit board 471 is able to be strongly connected to the circuit board connection terminal 95. Further, the circuit board 471 is able to be disposed with high position accuracy.

In accordance with the present preferred embodiment, the first protrusion portion includes the first protrusion portion 469a and the first protrusion portion 469b. That is, the protrusion portion includes a plurality of first protrusion portions. The elongated hole portion includes the elongated hole portion 474a and the elongated hole portion 474b. That is, a plurality (e.g., two) of elongated hole portions are disposed at the circuit board 71. Therefore, in the range from the inserting process S21 to the position-determining process S23, the movable direction of the circuit board 471 may be limited to the extension portion of the elongated hole portions 474a and 474b. As a result, the position determining of the circuit board 471 is able to be easily carried out. Further, the position of the circuit board 471 is able to be more accurately determined.

In accordance with the present preferred embodiment, when viewed from the axial direction, the elongated hole portions 474a and 474b preferably extend in the direction from the center axis J to the circuit board connection terminal. The first protrusion portions 469a and 469b contact the inner edge of the elongated hole portions 474a and 474b at the end located close to the center axis J of the elongated hole portions 474a and 474b. Therefore, when the circuit board 471 is disposed, the first protrusion portions 469a and 469*b* are able to move closer to the center of the circuit board 471. With this, the circuit board 471 is able to be more stably disposed.

In the present preferred embodiment, the notch portions 474*c* and 474*d* are disposed in the circuit board 471. The notch portions 474*c* and 474*d* are identical in structure to the second notch portions 74*c* and 74*d*. The notch portions 474*c* and 474*d* are fitted into the second protrusion portions 69*c* and 69*d*. The first protrusion portions 469*a* and 469*b* are disposed in the first region AR1. That is, in both regions separated from each other on the basis of the center axis J, the circuit board 471 is supported by the first protrusion portions 469*a* and 469*b* and the second protrusion portions 69*c* and 69*d*. With this, the circuit board 71 can be more stably fixed to the bus bar holder 461.

The notch portions 474*c* and 474*d* are opened toward the direction from the other end of the elongated hole portions 474*a* and 474*b* to one end located close to the center axis J. That is, the notch portions 474*c* and 474*d* are preferably opened in the direction from the end located far from the center axis J to one end located close to the center axis J. Therefore, in the position-determining process S23, when the circuit board 471 is perpendicular or substantially perpendicular to the axial direction, the notch portions 474*c* and 474*d* are able to be easily fitted into the second protrusion portions 69*c* and 69*d*.

In the present preferred embodiment, two notch portions are disposed in the circuit board. The notch portion includes a notch portion 474*c* and a notch portion 474*d*. That is, the notch portions are disposed at the outer edge of the circuit board 471. Therefore, the circuit board 471 is able to be more stably fixed to the bus bar holder 461.

The following structure and methods may also be applied to various preferred embodiments of the present invention.

Although the above description has disclosed that two elongated hole portions, the elongated hole portion 474*a*, and the elongated hole portion 474*b* preferably are provided for convenience of description, the present invention is not limited thereto. Only one elongated hole portion may be provided, or three or more elongated hole portions may be provided.

The extension direction of the elongated hole portions 474*a* and 474*b* may be the arrangement direction (Y-axis direction) of the circuit board connection terminal 95. That is, when viewed from the axial direction, the elongated hole portions 474*a* and 474*b* may extend in the direction to connect the center axis J to the circuit board connection terminal 95 or may extend in the arrangement direction of the circuit board connection terminal 95.

When viewed from the axial direction, the direction for connecting the center axis J to the circuit board connection terminal 95 is not limited only to the protrusion direction (X-axis direction) of the connector portion 63. When viewed from the axial direction, the direction to connect the center axis J to the circuit board connection terminal 95 includes all the directions, each of which ranges from the center axis J to the circuit board connection terminal 95 when viewed from the axial direction.

When the elongated hole portions 474*a* and 474*b* extend in the arrangement direction (Y-axis direction) of the circuit board connection terminal 95, the circuit board 471 is able to move to the arrangement direction of the circuit board connection terminal 95 during the moving process S22.

The same elongated hole portion as the elongated hole portions 474*a* and 474*b* may be provided instead of the notch portions 474*c* and 474*d*. Further, the notch portions 474*c* and 474*d* may not be provided. In this case, as described above, the positions of the first protrusion portions 469*a* and 469*b* are able to move closer to the center of the circuit board 471, such that the circuit board 471 is able to be stably disposed.

In accordance with a third preferred embodiment of the present invention, the circuit board is preferably fixed to the bus bar holder using snap-fit, differently from the first preferred embodiment. In the following description, the same components as those of the above-mentioned preferred embodiment are denoted with the same reference numbers and therefore the description of thereof may be omitted.

Figure 21:
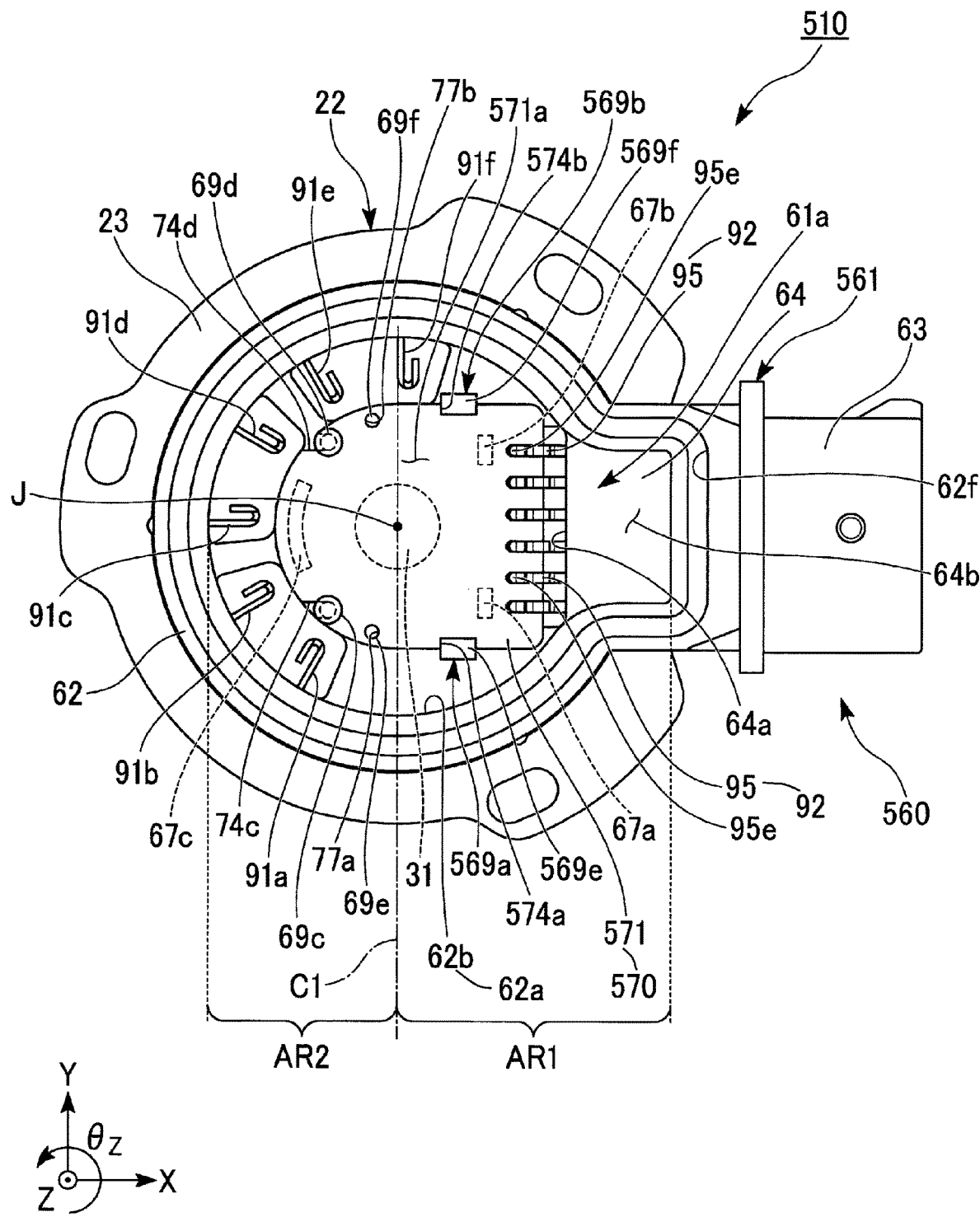
FIG. 21 is a plan view illustrating a motor according to a third preferred embodiment of the present invention.
Figure 22:
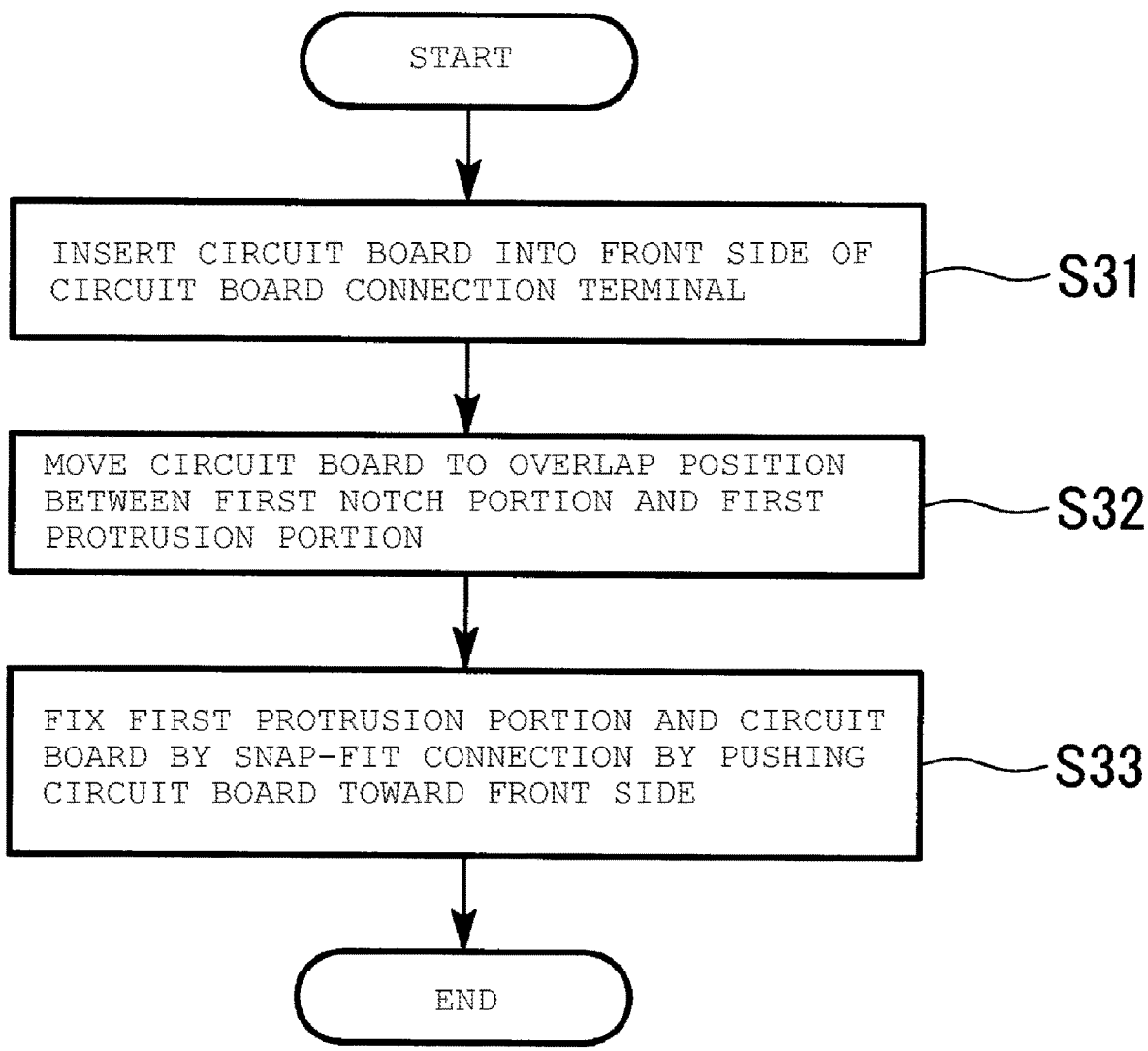
FIG. 22 is a flowchart illustrating a procedure of an arrangement process of a circuit board according to a third preferred embodiment of the present invention.
Figure 23:
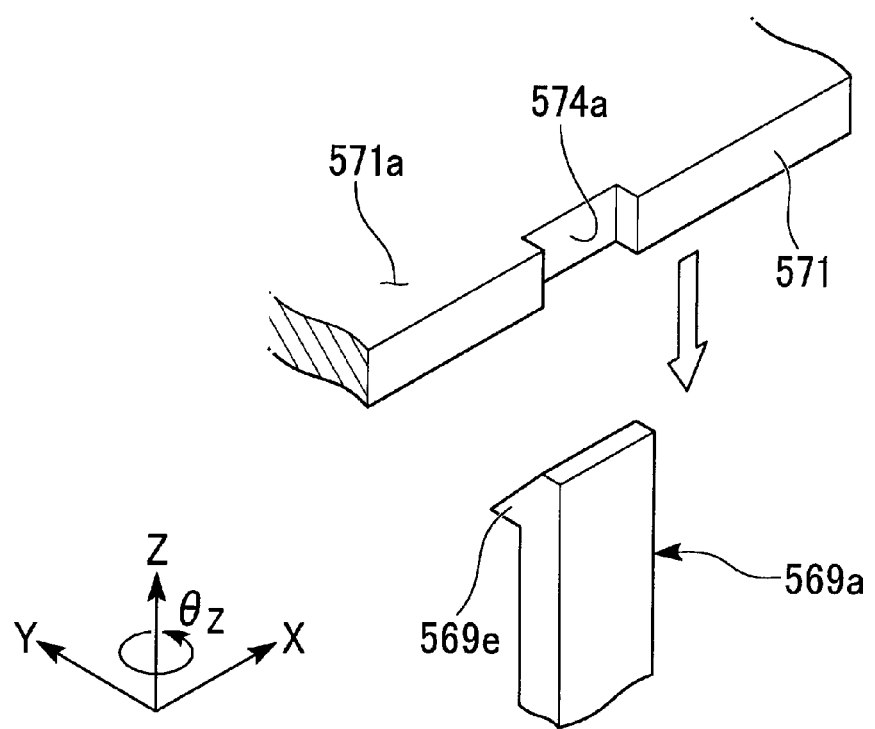
FIG. 23 is a perspective view illustrating some of the procedures of an arrangement process of the circuit board according to a third preferred embodiment of the present invention.
Figure 24:
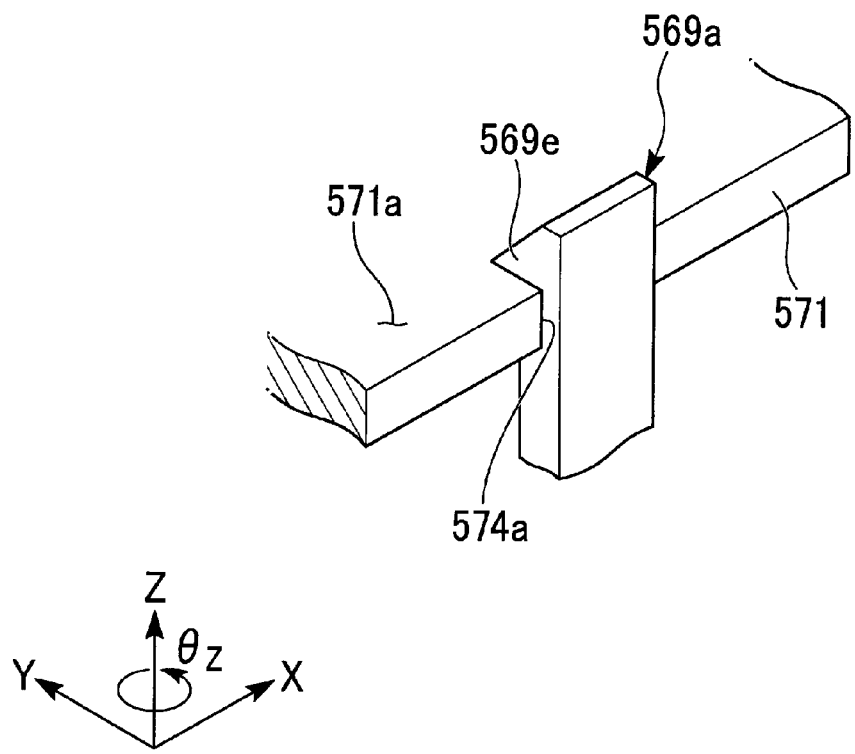
FIG. 24 is a perspective view illustrating some of the procedures of an arrangement process of the circuit board according to a third preferred embodiment of the present invention.

FIG. 21 is a plan view (XY plane view) illustrating the motor 510 according to this preferred embodiment. The cover 22 is omitted from FIG. 21. FIG. 22 is a flowchart illustrating the arrangement process of the circuit board 571 in the motor 510. FIGS. 23 and 24 are perspective views illustrating some of the arrangement process of the circuit board 571.

Referring to FIG. 21, the motor 510 preferably includes a bus bar assembly 560 and a controller 570. The bus bar assembly 560 includes a bus bar holder 561. The bus bar holder 561 preferably includes the first circuit board support portions 67*a* and 67*b*, the second circuit board support portion 67*c*, the first protrusion portions 569*a* and 569*b*, the second protrusion portions 69*c* and 69*d*, and the bus bar holder convex portions 69*e* and 69*f*. The controller 570 includes a circuit board 571.

The plane-view (XY plane view) shape of the circuit board 571 is preferably identical to the plane-view shape of the circuit board 471 of the second preferred embodiment, except with respect to the first notch portions 574*a* and 574*b*. In the circuit board 571, the first notch portions 574*a* and 574*b* are arranged at the outer edge of both ends of the arrangement direction (Y-axis direction) of the circuit board connection terminal 95.

As illustrated in FIG. 23, the plane-view (XY plane view) shape of the first notch portion 574*a* may have a rectangular or substantially rectangular shape. The plane-view (XY plane view) shape of the first notch portion 574*a* is not limited thereto. The plane-view (XY plane view) shape of the first notch portion 574*b* may rectangular or substantially rectangular, without being limited thereto. As illustrated in FIG. 21, the first protrusion portion 569*a* is inserted into the first notch portion 574*a*. The first protrusion portion 569*b* is inserted into the first notch portion 574*b*. Other elements of the circuit board 571 are preferably identical to those of the circuit board 471 of the second preferred embodiment.

The first protrusion portions 569*a* and 569*b* extend from the bottom portion 61*a* to the rear side (+Z side). As illustrated in FIG. 23, the first protrusion portion 569*a* may have a square pillar shape. The shape of the first protrusion portions 569*a* and 569*b* is not limited thereto. For example, the first protrusion portions 569*a* and 569*b* may be provided in a cylindrical or substantially cylindrical shape, a square pillar shape, or a polygonal pillar shape. The above-mentioned concept may also be equally applied to the first protrusion portion 569*b* in the same manner as in the first protrusion portion 569*a*.

As illustrated in FIG. 21, the first protrusion portions 569*a* and 569*b* are disposed along the division-line direction (Y-axis direction). The first protrusion portions 569*a* and 569*b* are preferably disposed in the first region AR1. The first protrusion portion 569*a* is disposed at one side (−Y side) of the circuit board 571 in the division-line direction (Y-axis direction). The first protrusion portion 569*b* is preferably disposed at the other side (+Y side) of the circuit board 571 in the division-line direction.

As illustrated in FIGS. 23 and 24, the claw portion 569*e* is disposed at the end of the rear side (+Z side) of the first protrusion 569*a*. The claw portion 569*e* is convex toward the circuit board 571 (+Y side). The claw portion 569*e* is hooked in the circuit board 571 at the first notch portion 574*a*. The claw portion 569*e* contacts the circuit board rear surface 571*a* of the circuit board 571.

As illustrated in FIG. 21, the claw portion 569*f* is preferably disposed at the end of the rear side (+Z side) of the first protrusion portion 569*b*. The claw portion 569*f* is convex toward the circuit board 571 (−Y side). That is, the claw portion 569*e* is convex toward the direction facing the claw portion 569*f*. The shape of the claw portion 569*f* is preferably identical or substantially identical to the shape of the claw portion 569*e*. The claw portion 569*f* is engaged with the circuit board 571 at the first notch portion 574*b*. The claw portion 569*f* contacts the circuit board rear surface 571*a*.

As described above, the first protrusion portions 569*a*, 569*b* are preferably fixed to the circuit board 571 by a snap-fit connection. Other elements of the motor 510 are preferably identical to those of the motor 10 of the first preferred embodiment.

A method of manufacturing the motor 510 according to the third preferred embodiment will be described. The present preferred embodiment will describe only the arrangement process of the circuit board 571 from among the method of manufacturing the motor 510.

As illustrated in FIG. 22, the arrangement process of the circuit board 571 according to the present invention preferably includes the inserting process S31, the moving process S32, and the fixing process S33. The inserting process S31 is preferably identical to the inserting process S11 of the first preferred embodiment.

In the moving process S32, when the circuit board 571 is viewed in the axial direction (Z-axis direction), the first notch portions 574*a* and 574*b* and the first protrusion portions 569*a* and 569*b* move to the overlap position. The circuit board 571 moves to the direction (+X direction) through which the connector portion 63 protrudes from the main body portion 62. Other aspects of the moving process S32 are identical to those of the moving process S12 of the first preferred embodiment.

As illustrated in FIGS. 23 and 24, the fixing process S33 pushes the circuit board 571 toward the front side (−Z side), and thus fixes the first protrusion portions 569*a* and 569*b* and the circuit board 571 by a snap-fit connection. By the range from the inserting process S31 to the fixing process S33, the arrangement process of the circuit board 571 is completed, and the circuit board 571 is disposed at the bus bar holder 561.

In accordance with the present preferred embodiment, the circuit board 571 is able to be strongly fixed to the circuit board connection terminal 95 in the same manner as in the first preferred embodiment. Further, the first protrusion portions 569*a* and 569*b* are fitted into the first notch portions 574*a* and 574*b* by a snap-fit connection. The circuit board 571 is fitted into the first protrusion portions 569*a* and 569*b* by a snap-fit connection, such that the circuit board 571 is able to be disposed at the bus bar holder 561 with high position accuracy.

By the above-mentioned structure, the circuit board 571 is able to be strongly fixed to the circuit board connection terminal 95, and the circuit board 571 is able to be disposed with high position accuracy.

In accordance with the present preferred embodiment, the first protrusion portions 569*a* and 569*b* are fixed to the circuit board 571 by a snap-fit connection. Therefore, the first protrusion portions 569*a* and 569*b* is able to be easily and strongly fixed to the circuit board 571. Further, the first protrusion portions 569*a* and 569*b* need not be deposited, such that the circuit board 571 is able to be easily fixed.

The following structure and methods may also be applied to various preferred embodiments of the present preferred embodiment.

The number of first notch portions is not limited thereto. Only one first notch portion may be provided or three or more first notch portions may be provided.

The second protrusion portions 69*c* and 69*d* may also be fixed to the circuit board 571 by a snap-fit connection. With the above-mentioned structure, the second protrusion portions 69*c* and 69*d* need not be deposited, such that the circuit board 571 is able to be more easily fixed.

In the inserting process S31, the circuit board 571 is pushed at the spacing between two first protrusion portions 569*a* and 569*b*, such that the surface of the circuit board 571 of the first protrusion portions 569*a* and 569*b* may also be in contact with the outer edge of the circuit board 571. In this state, the first protrusion portions 569*a* and 569*b* is tilted toward the opposite side of the circuit board 571 through elastic deformation. Assuming that the moving process S32 is carried out in the above state, when the first protrusion portions 569*a* and 569*b* are disposed at the position of the first notch portions 574*a* and 574*b*, the first protrusion portions 569*a* and 569*b* are fixed to the circuit board 571 by a snap-fit connection. Therefore, the position of the circuit board 571 is able to be easily determined in the moving process S32. Further, the position of the circuit board 571 is determined, and at the same time the fixing process S33 is performed, such that the circuit board 571 is able to be easily fixed.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
   a rotor including a shaft with a center on a center axis extending in one direction;
   a stator enclosing the rotor and rotating the rotor about the center axis;
   a first bearing located at a first side in the one direction of the stator and supporting the shaft;
   a second bearing located at a second side in the one direction of the stator opposite to the first side of the stator and supporting the shaft;
   a cylindrical housing holding the stator and the first bearing;
   a bus bar assembly holding the second bearing and allowing an end of the bus bar adjacent to the first side to be located in the housing;
   a cover fixed to the housing to cover at least a portion of a side of the bus bar assembly adjacent to the second side; and
   a circuit board located between the second bearing and the cover in the one direction, and allowing a surface of the circuit board adjacent to the second side to cross the one direction; wherein the bus bar assembly includes:
- a bus bar electrically connected to the stator;
- a wiring member electrically connecting an external power supply to the circuit board; and
- a bus bar holder holding the bus bar and the wiring member;

the bus bar holder includes:
- a cylindrical main body portion including an opening adjacent to the second side;
- a connector portion protruding from the main body portion toward a radially outer side of the center axis;
- a bottom portion widening from an inner surface of the main body portion to a radially inner side of the center axis; and
- a plurality of protrusion portions extending from the bottom portion toward the second side;

the cover covers the opening adjacent to the second side;

the wiring member includes:
- an external power-supply connection terminal provided at the connector portion to be electrically connected to the external power-supply; and
- a plurality of circuit board connection terminals electrically connected to the surface adjacent to the second side;

the plurality of circuit board connection terminals is arranged along a predetermined direction at the surface of the circuit board;

the protrusion portion includes a first protrusion portion;

an outer edge of the circuit board is provided with a first notch portion in which the first protrusion portion is located;

the first notch portion is opened toward any one of a direction extending from the center axis to the circuit board connection terminal and the predetermined direction when viewed from the one direction;

at least one of the plurality of circuit board connection terminals includes:
- a first connection portion extending in a radial direction;
- a first extension portion extending from an end of a radially inner side of the first connection portion toward the second side;
- a second connection portion extending from an end of a side of the first extension portion adjacent to the second side toward a radially inner side of the second connection portion;
- a second extension portion extending from an end of the radially inner side of the second connection portion toward the first side, and
- a contact portion extending from an end of a side of the second extension portion adjacent to the first side toward a radially inner side of the contact portion; and a side of the contact portion adjacent to the first side is electrically connected to the surface of the side of the circuit board adjacent to the second side.

2. The motor according to claim 1, wherein:
the first protrusion portion, when viewed from the one direction, is disposed at a region of the bottom portion to define a side at which the circuit board connection terminal is disposed;
the protrusion portion, when viewed from the one direction, includes a second protrusion portion disposed in a region of the bottom portion corresponding to an opposite side of the side at which the circuit board connection terminal is disposed;
an outer edge of the circuit board is provided with a second notch portion in which the second protrusion portion is located; and
the second notch portion is opened toward a direction opposite to the first notch portion.

3. The motor according to claim 1, wherein:
the first protrusion portion, when viewed from the one direction, is disposed at a region of the bottom portion to define a side at which the circuit board connection terminal is disposed;
the protrusion portion, when viewed from the one direction, includes a second protrusion portion disposed in a region of the bottom portion corresponding to an opposite side of the side at which the circuit board connection terminal is disposed; and
an outer edge of the circuit board is provided with a second notch portion in which the second protrusion portion is located.

4. The motor according to claim 3, wherein:
the protrusion portion includes a plurality of second protrusion portions; and
the outer edge of the circuit board is provided with a plurality of second notch portions.

5. The motor according to claim 1, wherein:
the protrusion portion includes a plurality of first protrusion portions; and
the outer edge of the circuit board is provided with a plurality of the first notch portions.

6. The motor according to claim 1, wherein:
the circuit board includes a circuit board main body and a circuit board convex portion that protrudes from both ends of the predetermined direction of the circuit board main body to an opposite side of the circuit board main body; and
the first notch portion is disposed at the circuit board convex portion.

7. The motor according to claim 1, wherein:
at least one protrusion portion is located on the surface of the side of the circuit board adjacent to the second side.

8. The motor according to claim 1, wherein:
the bus bar holder includes a bus bar holder convex portion extending from the bottom portion toward the second side; and
the bus bar holder convex portion is located in a hole portion provided in the circuit board.

9. The motor according to claim 1, wherein:
the protrusion portion includes a stepped portion that decreases in thickness toward the second side; and
a stepped surface crossing the one direction of the stepped portion contacts a surface of the circuit board adjacent to the first side.

10. The motor according to claim 9, wherein:
the bus bar holder includes a second circuit board support portion that extends from the bottom portion toward the second side to support the circuit board from the first side; and
the second circuit board support portion, when viewed from the one direction, is disposed at a region of the bottom portion corresponding to an opposite side of the side at which the circuit board connection terminal is disposed.

11. The motor according to claim 1, wherein:
the circuit board connection terminal includes a contact portion contacting the circuit board;

the bus bar holder includes a first circuit board support portion that extends from the bottom portion toward the second side to support the circuit board from the first side;

the first circuit board support portion, when viewed from the one direction, is disposed at a region of the bottom portion to define a side at which the circuit board connection terminal is disposed; and the first circuit board support portion and the contact portion are disposed at different positions when viewed from the one direction.

12. A motor, comprising:

a rotor including a shaft with a center on a center axis extending in one direction;

a stator enclosing the rotor and rotating the rotor about the center axis;

a first bearing located at a first side in the one direction of the stator and supporting the shaft;

a second bearing located at a second side opposite to the first side of the stator and supporting the shaft;

a cylindrical housing holding the stator and the first bearing;

a bus bar assembly holding the second bearing and allowing an end of the first side to be located in the housing;

a cover fixed to the housing to cover at least a portion of the second side of the bus bar assembly; and a circuit board which is disposed between the second bearing and the cover in the one direction, and allows a surface of the second side to cross the one direction, wherein the bus bar assembly includes:
 a bus bar electrically connected to the stator;
 a wiring member electrically connecting an external power supply to the circuit board; and
 a bus bar holder holding the bus bar and the wiring member, the bus bar holder includes:
 a cylindrical main body portion including an opening at the second side;
 a connector portion protruding from the main body portion toward a radially outer side of the center axis;
 a bottom portion widening from an inner surface of the main body portion to the radially inner side; and
 a plurality of protrusion portions extending from the bottom portion toward the second side;

the cover covers the second side of the opening;

the wiring member includes:
 an external power-supply connection terminal provided at the connector portion to be electrically connected to the external power-supply; and
 a plurality of circuit board connection terminals electrically connected to the surface of the second side of the circuit board;

the plurality of circuit board connection terminals is arranged along a predetermined direction at the surface of the second side of the circuit board;

the protrusion portion includes a first protrusion portion;

the circuit board is provided with an elongated hole portion in which the first protrusion portion is located;

the elongated hole portion extends toward a direction connecting the center axis to the circuit board connection terminal when viewed from the one direction, or extends in the predetermined direction; and the first protrusion portion contacts an inner edge of the elongated hole portion at one end of the elongated hole portion.

13. The motor according to claim 12, wherein:
the protrusion portion includes a plurality of first protrusion portions; and
the circuit board is provided with a plurality of the elongated hole portions.

14. The motor according to claim 12, wherein:
the elongated hole portion, when viewed from the one direction, extends in a direction connecting the center axis to the circuit board connection terminal; and
the one end of the elongated hole portion is an end of a side close to the center axis.

15. The motor according to claim 12, wherein:
the first protrusion portion, when viewed from the one direction, is disposed at a region of the bottom portion to define a side at which the circuit board connection terminal is disposed;
the protrusion portion, when viewed from the one direction, includes a second protrusion portion disposed in a region of the bottom portion corresponding to an opposite side of the side at which the circuit board connection terminal is disposed; and
an outer edge of the circuit board is provided with a notch portion in which the second protrusion portion is located.

16. The motor according to claim 12, wherein the notch portion is opened from the other end of the elongated hole portion toward the one end.

17. The motor according to claim 12, wherein:
the protrusion portion includes a plurality of second protrusion portions; and
the outer edge of the circuit board is provided with a plurality of the notch portions.

18. The motor according to claim 12, wherein:
the protrusion portion is located on the surface of the second side of the circuit board.

19. The motor according to claim 12, wherein:
the bus bar holder includes a bus bar holder convex portion extending from the bottom portion toward the second side; and
the bus bar holder convex portion is located in a hole portion provided in the circuit board.

20. The motor according to claim 12, wherein:
at least one protrusion portion includes a stepped portion that decreases in thickness toward the second side; and
a stepped surface crossing the one direction of the stepped portion contacts a surface of the first side of the circuit board.

21. The motor according to claim 12, wherein:
the circuit board connection terminal includes a contact portion contacting the circuit board;
the bus bar holder includes a first circuit board support portion that extends from the bottom portion toward the second side to support the circuit board from the first side;
the first circuit board support portion, when viewed from the one direction, is disposed at a region of the bottom portion to define a side at which the circuit board connection terminal is disposed; and
the first circuit board support portion and the contact portion are disposed at different positions when viewed from the one direction.

22. The motor according to claim 21, wherein:
the bus bar holder includes a second circuit board support portion that extends from the bottom portion toward the second side to support the circuit board from the first side; and
the second circuit board support portion, when viewed from the one direction, is disposed at a region of the bottom portion corresponding to an opposite side of the side at which the circuit board connection terminal is disposed.

23. A motor, comprising:
a rotor including a shaft with a center on a center axis extending in one direction;
a stator enclosing the rotor and rotating the rotor about the center axis;
a first bearing located at a first side in the one direction of the stator and supporting the shaft;
a second bearing located at a second side opposite to the first side of the stator and supporting the shaft;
a cylindrical housing holding the stator and the first bearing;
a bus bar assembly holding the second bearing and allowing an end of the first side to be located in the housing;
a cover fixed to the housing to cover at least a portion of the second side of the bus bar assembly; and
a circuit board which is disposed between the second bearing and the cover in the one direction, and allows a surface of the second side to cross the one direction; wherein
the bus bar assembly includes:
  a bus bar electrically connected to the stator;
  a wiring member electrically connecting an external power supply to the circuit board; and
  a bus bar holder holding the bus bar and the wiring member,
the bus bar holder includes:
  a cylindrical main body portion including an opening at the second side;
  a connector portion protruding from the main body portion toward a radially outer side of the center axis;
  a bottom portion widening from an inner surface of the main body portion to the radially inner side; and
  a plurality of protrusion portions extending from the bottom portion toward the second side;
the cover covers the second side of the opening;
the wiring member includes:
  an external power-supply connection terminal provided in the connector portion to be electrically connected to the external power-supply; and
  a plurality of circuit board connection terminals electrically connected to the surface of the second side of the circuit board;
the plurality of circuit board connection terminals is arranged along a predetermined direction at the surface of the second side of the circuit board;
the protrusion portion includes a first protrusion portion; and
an outer edge of the circuit board is provided with a first notch portion in which the first protrusion portion is located;
the end of the second side of the first protrusion portion is provided with a claw portion;
the first protrusion portion is fixed to the circuit board by a snap-fit connection;
at least one of the plurality of circuit board connection terminals includes:
  a first connection portion extending in a radial direction;
  a first extension portion extending from an end of a radially inner side of the first connection portion toward the second side;
  a second connection portion extending from an end of a side of the first extension portion adjacent to the second side toward a radially inner side of the second connection portion;
  a second extension portion extending from an end of the radially inner side of the second connection portion toward the first side, and
  a contact portion extending from an end of a side of the second extension portion adjacent to the first side toward a radially inner side of the contact portion; and
a side of the contact portion adjacent to the first side is electrically connected to the surface of the side of the circuit board adjacent to the second side.

24. The motor according to claim 23, wherein:
the first protrusion portion, when viewed from the one direction, is disposed at a region of the bottom portion to define a side at which the circuit board connection terminal is disposed;
the protrusion portion, when viewed from the one direction, includes a second protrusion portion disposed in a region of the bottom portion corresponding to an opposite side of the side at which the circuit board connection terminal is disposed; and
an outer edge of the circuit board is provided with a second notch portion in which the second protrusion portion is located.

25. The motor according to claim 24, wherein:
the protrusion portion includes a plurality of second protrusion portions; and
the outer edge of the circuit board is provided with a plurality of second notch portions.

26. The motor according to claim 25, wherein:
the protrusion portion includes a plurality of first protrusion portions; and
the outer edge of the circuit board is provided with a plurality of the first notch portions.

27. The motor according to claim 23, wherein:
the circuit board includes a circuit board main body and a circuit board convex portion that protrudes from both ends of the predetermined direction of the circuit board main body to an opposite side of the circuit board main body; and
the first notch portion is disposed at the circuit board convex portion.

28. The motor according to claim 23, wherein:
the protrusion portion is located on the surface of the second side of the circuit board.

29. The motor according to claim 23, wherein:
the bus bar holder includes a bus bar holder convex portion extending from the bottom portion toward the second side; and
the bus bar holder convex portion is located in a hole portion provided in the circuit board.

30. The motor according to claim 23, wherein:
at least one protrusion portion includes a stepped portion that decreases in toward the second side; and
a stepped surface crossing the one direction of the stepped portion contacts a surface of the first side of the circuit board.

31. The motor according to claim 23, wherein:
the circuit board connection terminal includes a contact portion connected to the circuit board;
the bus bar holder includes a first circuit board support portion that extends from the bottom portion toward the second side to support the circuit board from the first side;
the first circuit board support portion, when viewed from the one direction, is disposed at a region of the bottom portion to define a side at which the circuit board connection terminal is disposed; and
the first circuit board support portion and the contact portion are disposed at different positions when viewed from the one direction.

32. The motor according to claim 31, wherein:
the bus bar holder includes a second circuit board support portion that extends from the bottom portion toward the second side to support the circuit board from the first side; and
the second circuit board support portion, when viewed from the one direction, is disposed at a region of the bottom portion corresponding to an opposite side of the side at which the circuit board connection terminal is disposed.

* * * * *